US012678015B2

(12) United States Patent
Kim et al.

(10) Patent No.: US 12,678,015 B2
(45) Date of Patent: Jul. 14, 2026

(54) DISPLAY APPARATUS AND HOME APPLIANCE HAVING SAME

(71) Applicants: SAMSUNG ELECTRONICS CO., LTD., Suwon-si (KR); DGT CORPORATION, Goyang-si (KR)

(72) Inventors: Jinhan Kim, Suwon-si (KR); Kyonghyong Kim, Suwon-si (KR); Jongil Kim, Suwon-si (KR); Dukho Do, Suwon-si (KR); Sungjin Kim, Suwon-si (KR); Changhoon Lee, Suwon-si (KR); Junsik Kim, Goyang-si (KR); Kieok Kim, Goyang-si (KR)

(73) Assignees: SAMSUNG ELECTRONICS CO., LTD., Suwon-si (KR); DGT CORPORATION, Goyang-si (KR)

( * ) Notice: Subject to any disclaimer, the term of this patent is extended or adjusted under 35 U.S.C. 154(b) by 0 days.

(21) Appl. No.: 19/214,180

(22) Filed: May 21, 2025

(65) Prior Publication Data

US 2025/0275666 A1 Sep. 4, 2025

Related U.S. Application Data

(63) Continuation of application No. PCT/KR2023/019782, filed on Dec. 4, 2023.

(30) Foreign Application Priority Data

Dec. 30, 2022 (KR) ........................ 10-2022-0190440
Jun. 8, 2023 (KR) ........................ 10-2023-0073866

(51) Int. Cl.
*A47L 15/42* (2006.01)
*G03B 21/14* (2006.01)
(Continued)

(52) U.S. Cl.
CPC ........ *A47L 15/4293* (2013.01); *G03B 21/142* (2013.01); *G03B 29/00* (2013.01);
(Continued)

(58) Field of Classification Search
CPC ...... A47L 15/4293; A47L 15/00; A47L 15/42; G03B 21/142; G03B 29/00; G03B 21/20;
(Continued)

(56) References Cited

U.S. PATENT DOCUMENTS 5,539,580 A 7/1996 Kim
7,204,598 B2 4/2007 Kuroda et al.
(Continued)

FOREIGN PATENT DOCUMENTS

CN 100535739 C 9/2009
CN 112629109 A 4/2021
(Continued)

OTHER PUBLICATIONS

International Search Report and Written Opinion issued Mar. 29, 2024 for Application No. PCT/KR2023/019782.
(Continued)

*Primary Examiner* — Benjamin L Osterhout
(74) *Attorney, Agent, or Firm* — STAAS & HALSEY LLP

(57) ABSTRACT

A home appliance including a display apparatus configured to project an image. The display apparatus includes an image generator comprising a light source, a display device configured to transmit light generated by the light source and display the image, and an illumination lens configured to condense the light generated by the light source to the display device, an adjustor including a refractive lens configured to adjust a size of the image to allow adjustable size of the image projected from the display apparatus, and a housing configured to accommodate the image generator
(Continued)

and the adjustor. The housing includes an inlet through which air flows into the housing, and an outlet through which the air is discharged, and the outlet, the light source, the illumination lens, the display device, and the inlet are sequentially arranged from an upper side of the housing to a lower side of the housing.

15 Claims, 13 Drawing Sheets

(51) Int. Cl.
| | |
|---|---|
| *G03B 29/00* | (2021.01) |
| *A47L 15/00* | (2006.01) |
| *G03B 21/10* | (2006.01) |
| *G03B 21/16* | (2006.01) |
| *G03B 21/20* | (2006.01) |
| *G03B 21/53* | (2006.01) |

(52) U.S. Cl.
CPC .............. *A47L 15/00* (2013.01); *A47L 15/42* (2013.01); *G03B 21/10* (2013.01); *G03B 21/14* (2013.01); *G03B 21/145* (2013.01); *G03B 21/16* (2013.01); *G03B 21/20* (2013.01); *G03B 21/53* (2013.01)

(58) Field of Classification Search
CPC ...... G03B 21/145; G03B 21/10; G03B 21/16; G03B 21/53; G03B 21/14
See application file for complete search history.

(56) References Cited

U.S. PATENT DOCUMENTS

| | | | |
|---|---|---|---|
| 7,230,777 B2 | 6/2007 | Ye | |
| 8,081,085 B2 | 12/2011 | Jerg et al. | |
| 8,870,392 B2 | 10/2014 | Kleinert et al. | |
| 9,161,675 B2 | 10/2015 | Eng et al. | |
| 9,394,737 B2 | 7/2016 | Gehin et al. | |
| 9,521,382 B2 | 12/2016 | Lee et al. | |
| 9,568,813 B2 | 2/2017 | Park et al. | |
| 9,569,103 B2 | 2/2017 | Kim | |
| 10,564,405 B2 | 2/2020 | Kim | |
| 11,125,981 B2 | 9/2021 | Song et al. | |
| 11,278,179 B2 | 3/2022 | Brewer et al. | |
| 11,484,181 B2 | 11/2022 | Ozertug et al. | |
| 11,852,398 B2 | 12/2023 | Kim et al. | |
| 12,169,091 B2 | 12/2024 | Kim et al. | |
| 12,329,342 B2 * | 6/2025 | Jung | G03B 21/28 |
| 2006/0221469 A1 | 10/2006 | Ye | |
| 2007/0296931 A1 | 12/2007 | Choi et al. | |
| 2008/0178916 A1 | 7/2008 | Kedjierski | |
| 2010/0231506 A1 | 9/2010 | Pryor | |
| 2012/0320345 A1 | 12/2012 | Kleinert et al. | |
| 2013/0027214 A1 | 1/2013 | Eng et al. | |
| 2016/0220039 A1 | 8/2016 | Chang et al. | |
| 2018/0038637 A1 * | 2/2018 | Kim | F25D 29/005 |
| 2019/0086141 A1 * | 3/2019 | Kim | G01D 5/28 |
| 2019/0212642 A1 | 7/2019 | McMillan | |
| 2020/0310550 A1 | 10/2020 | Sage et al. | |
| 2020/0349860 A1 | 11/2020 | Vengroff et al. | |
| 2022/0003490 A1 | 1/2022 | Park et al. | |
| 2022/0066182 A1 | 3/2022 | Bueler et al. | |
| 2022/0408996 A1 | 12/2022 | King et al. | |
| 2022/0413371 A1 | 12/2022 | Hou et al. | |
| 2023/0047148 A1 | 2/2023 | Kim | |

FOREIGN PATENT DOCUMENTS

| | | | | |
|---|---|---|---|---|
| CN | 113867083 A | 12/2021 | | |
| CN | 217643968 U | 10/2022 | | |
| CN | 114304994 B | 2/2023 | | |
| DE | 10259763 A1 * | 7/2004 | | H01H 9/16 |
| EP | 1 421 893 B2 | 3/2005 | | |
| EP | 2850989 A1 * | 3/2015 | | A47L 15/4293 |
| EP | 2 542 139 B1 | 6/2015 | | |
| JP | 2000-35537 | 2/2000 | | |
| JP | 2001-215388 | 8/2001 | | |
| JP | 2005-31271 | 2/2005 | | |
| JP | 2007-102095 | 4/2007 | | |
| JP | 2009-186527 | 8/2009 | | |
| JP | 2011-221244 | 11/2011 | | |
| JP | 2015-194592 | 11/2015 | | |
| JP | 2018-97336 | 6/2018 | | |
| JP | 7273907 | 5/2023 | | |
| KP | 10-2012-0011892 | 2/2012 | | |
| KR | 0141203 | 3/1998 | | |
| KR | 1998-014544 | 6/1998 | | |
| KR | 10-0141203 | 8/1998 | | |
| KR | 2006-284788 | 10/2006 | | |
| KR | 10-2007-0000679 | 1/2007 | | |
| KR | 10-0794794 | 1/2008 | | |
| KR | 10-0841470 | 6/2008 | | |
| KR | 10-2012-0011892 | 2/2012 | | |
| KR | 10-1130119 | 3/2012 | | |
| KR | 10-2012-0094638 | 8/2012 | | |
| KR | 10-1334585 | 12/2013 | | |
| KR | 10-2014-0082961 A | 7/2014 | | |
| KR | 10-2015-0009364 | 1/2015 | | |
| KR | 10-2015-0102556 | 9/2015 | | |
| KR | 10-2015-0114763 | 10/2015 | | |
| KR | 10-2017-0028795 | 3/2017 | | |
| KR | 10-2018-0106643 | 10/2018 | | |
| KR | 10-2019-0057201 | 5/2019 | | |
| KR | 10-1995754 | 7/2019 | | |
| KR | 10-2019-0125066 | 11/2019 | | |
| KR | 10-2020-0011505 | 2/2020 | | |
| KR | 10-2076192 | 2/2020 | | |
| KR | 10-2076192 B1 | 2/2020 | | |
| KR | 10-2179637 | 11/2020 | | |
| KR | 10-2020-0134772 | 12/2020 | | |
| KR | 10-2185714 | 12/2020 | | |
| KR | 10-2185714 B1 | 12/2020 | | |
| KR | 10-2021-0142190 | 11/2021 | | |
| KR | 10-2328135 | 11/2021 | | |
| KR | 2022-515826 | 2/2022 | | |
| KR | 10-2022-0102144 A | 7/2022 | | |
| KR | 10-2023-0072302 | 5/2023 | | |
| KR | 10-2024-0108217 | 7/2024 | | |
| WO | WO 2004/057636 A1 | 7/2004 | | |
| WO | WO 2006/013009 A1 | 2/2006 | | |
| WO | WO-2011107242 A1 * | 9/2011 | | A47L 15/4293 |

OTHER PUBLICATIONS

Non Final Action issued in U.S. Appl. No. 19/220,380 on Nov. 7, 2025.

International Search Report and Written Opinion issued Apr. 2, 2024 for Application No. PCT/KR2023/019786.

Final Action issued in U.S. Appl. No. 19/211,828 on Jan. 12, 2026.

Interview Summary issued in U.S. Appl. No. 19/211,828 on Oct. 17, 2025.

Non-Final Action issued in U.S. Appl. No. 19/211,828 on Aug. 1, 2025.

Notice of Allowance issued in U.S. Appl. No. 18/531,199 on Feb. 17, 2026.

Final Office Action issued in U.S. Appl. No. 18/531,199 on Nov. 21, 2025.

Non-Final Office Action issued in U.S. Appl. No. 18/531,199 on Jul. 25, 2025.

Interview Summary issued in U.S. Appl. No. 18/531,199 on Sep. 22, 2025.

International Search Report dated Jan. 29, 2024 for International Application No. PCT/KR2023/016010.

Written Opinion of the International Searching Authority dated Jan. 29, 2024 for International Application No. PCT/KR2023/016010.

Supplementary European Search Report dated Oct. 2, 2025 issued in EP 23 91 2490.

International Search Report and Written Opinion issued Apr. 2, 2024 for International Application No. PCT/KR2023/019789.

(56)     References Cited

OTHER PUBLICATIONS

U.S. Appl. No. 19/220,380, May 28, 2025, Jinhan Kim et al., Samsung Electronics Co., Ltd.
U.S. Appl. No. 19/211,828, May 19, 2025, Jinhan Kim et al., Samsung Electronics Co., Ltd. DGT Corporation.
U.S. Appl. No. 18/531,199, Dec. 6, 2023, Jinhan Kim et al., Samsung Electronics Co., Ltd.

* cited by examiner

DISPLAY APPARATUS AND HOME APPLIANCE HAVING SAME

CROSS-REFERENCE TO RELATED APPLICATION

This application is a continuation application is a continuation application, under 35 U.S.C. § 111(a), of international application No. PCT/KR2023/019782, filed Dec. 4, 2023, which claims priority under 35 U.S.C. § 119 to Korean Patent Application No. 10-2022-0190440, filed Dec. 30, 2022, and Korean Patent Application No. 10-2023-0073866, filed Jun. 8, 2023, the disclosures of which are incorporated herein by reference in their entireties.

TECHNICAL FIELD

The disclosure relates to an apparatus configured to display a display by a beam projector and a home appliance including the apparatus.

BACKGROUND ART

Home appliances are mainly provided in a user's home to help with the user's housework, and include refrigerators, air conditioners, air purifiers, vacuum cleaners, cooking appliances, dishwashers, clothes care machines, washing machines, and the like.

The home appliance may include a display apparatus configured to allow a user to check a driving state of the home appliance.

The display apparatus may display a display through a display device arranged in the home appliance or display a display by projecting light on an outer region of the home appliance through a beam projector function (image projection function).

DISCLOSURE

Technical Problem

An embodiment of the present disclosure provides a display apparatus capable of projecting an image, the display apparatus capable of allowing an image generator, which is configured to provide light and generate an image, and an adjustor, which is configured to adjust a projected size of the image generated by the image generator, to be a single module, and a home appliance including the same.

Technical Solution

According to an embodiment of the present disclosure, a home appliance may include a display apparatus configured to project an image including state information of the home appliance, wherein the display apparatus is arranged on a rear side of a front panel arranged on a front surface of the home appliance, and configured to project the image downward from the home appliance, wherein the display apparatus includes an image generator comprising a light source, a display device configured to transmit light generated by the light source and display the image, and an illumination lens configured to condense the light generated by the light source to the display device, an adjustor including a refractive lens configured to adjust a size of the image displayed on the display device to allow a size of the image projected from the display apparatus to be adjustable, and a housing configured to accommodate the image generator and the adjustor, wherein the housing includes an inlet through which air flows into the housing, and an outlet through which the air introduced through the inlet is discharged, and the outlet, the light source, the illumination lens, the display device, and the inlet are sequentially arranged from an upper side of the housing to a lower side of the housing.

Advantageous Effects

The display apparatus according to various embodiments of the present disclosure may minimize a size of the module including the image generator and the adjustor.

DESCRIPTION OF DRAWINGS

FIG. 2 is a perspective view of a state in which a door of the dishwasher according to an embodiment is opened.

MODES OF THE INVENTION

Figure 1:
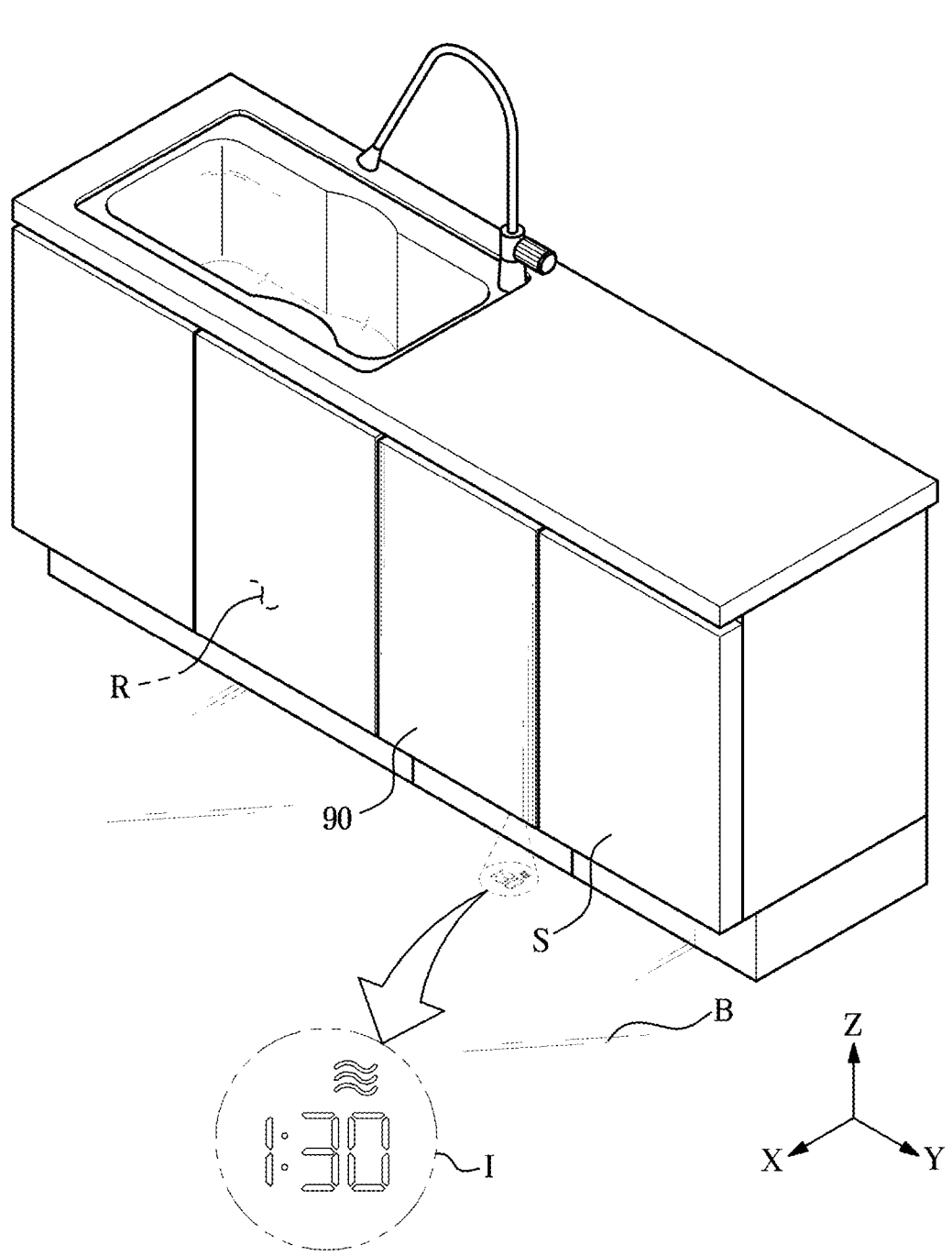
FIG. 1 is a view illustrating a system kitchen in which a dishwasher according to an embodiment is installed in a built-in manner.

The various embodiments and the terms used therein are not intended to limit the technology disclosed herein to specific forms, and the disclosure should be understood to include various modifications, equivalents, and/or alternatives to the corresponding embodiments.

In describing the drawings, similar reference numerals may be used to designate similar constituent elements.

A singular expression may include a plural expression unless they are definitely different in a context.

The expressions "A or B," "at least one of A or/and B," or "one or more of A or/and B," A, B or C," "at least one of A, B or/and C," or "one or more of A, B or/and C," and the like used herein may include any and all combinations of one or more of the associated listed items.

The term of "and/or" includes a plurality of combinations of relevant items or any one item among a plurality of relevant items.

Herein, the expressions "a first", "a second", "the first", "the second", etc., may simply be used to distinguish an element from other elements, but is not limited to another aspect (e.g., importance or order) of elements.

When an element (e.g., a first element) is referred to as being "(functionally or communicatively) coupled," or "connected" to another element (e.g., a second element), the first element may be connected to the second element, directly (e.g., wired), wirelessly, or through a third element.

In this disclosure, the terms "including", "having", and the like are used to specify features, numbers, steps, operations, elements, components, or combinations thereof, but do not preclude the presence or addition of one or more of the features, numbers, steps, operations, elements, components, or combinations thereof.

When an element is said to be "connected", "coupled", "supported" or "contacted" with another element, this includes not only when elements are directly connected, coupled, supported or contacted, but also when elements are indirectly connected, coupled, supported or contacted through a third element.

Throughout the description, when an element is "on" another element, this includes not only when the element is in contact with the other element, but also when there is another element between the two elements.

Hereinafter exemplary embodiments of the present disclosure will be described in detail with reference to the accompanying drawings.

The present disclosure describes a dishwasher 1 as an example of home appliances, but it may be applied to various home appliances such as washing machines, refrigerators, ovens, microwave ovens, and air conditioners.

On the other hand, the terms "up and down", "lower side", and "front and rear" used in the following description are defined based on the direction arrows of FIG. 1, but the shape and location of each component are not limited by these terms.

Figure 2:
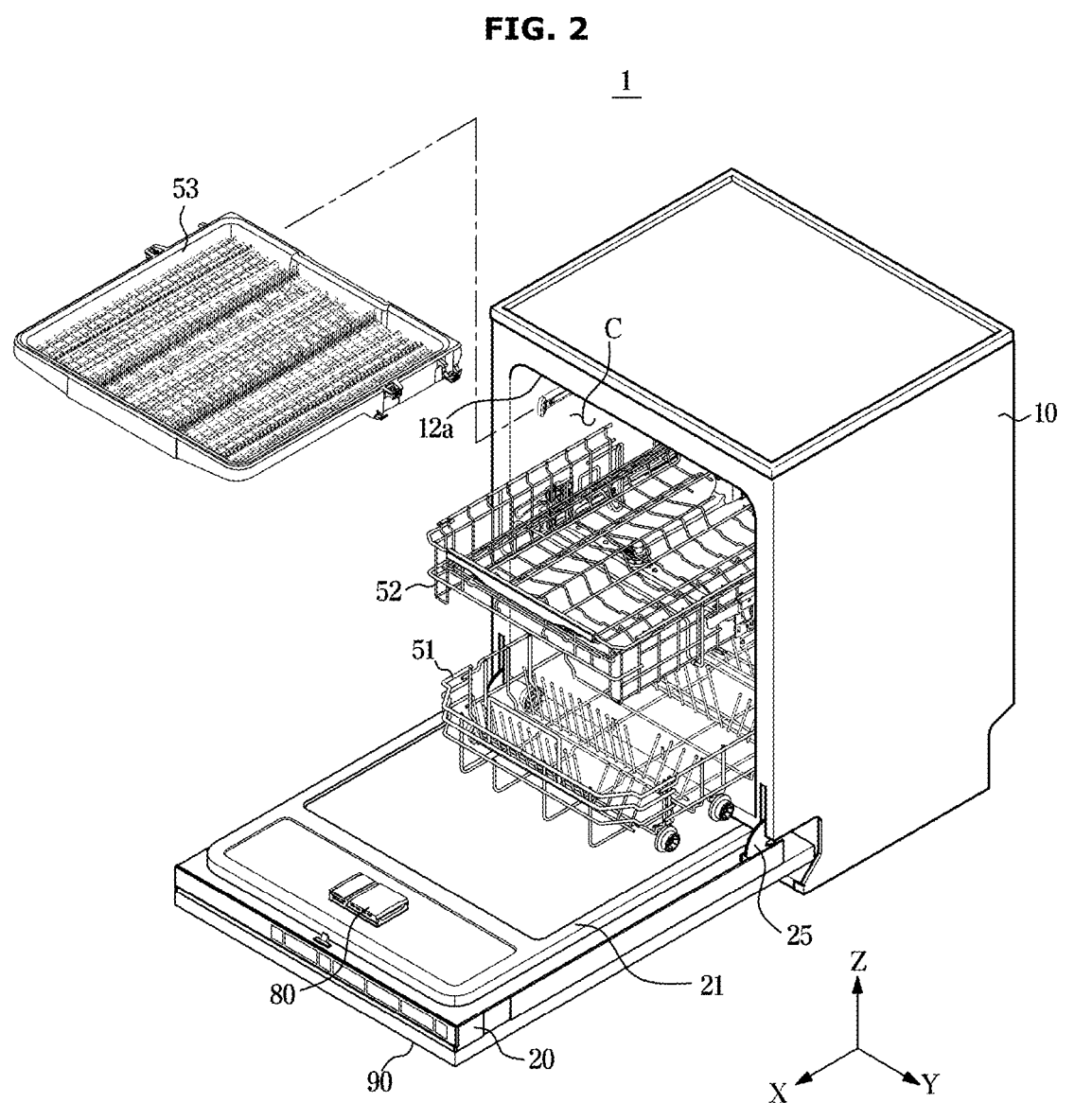
Figure 3:
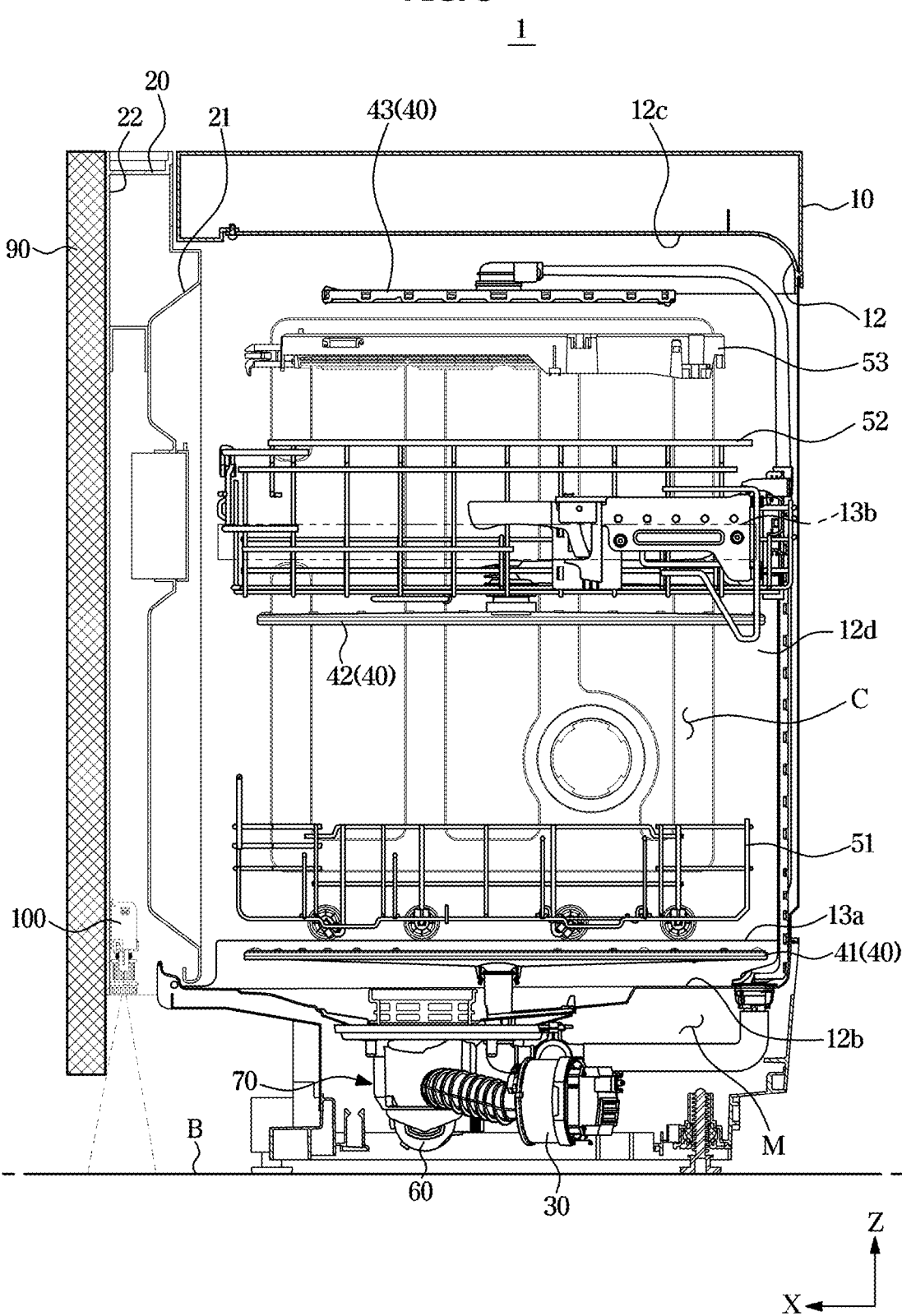
FIG. 3 is a schematic cross-sectional view of the dishwasher according to an embodiment.

FIG. 1 is a view illustrating a system kitchen in which a dishwasher according to an embodiment is installed in a built-in manner, FIG. 2 is a perspective view of a state in which a door of the dishwasher according to an embodiment is opened, and FIG. 3 is a schematic cross-sectional view of the dishwasher according to an embodiment. Referring to FIGS. 1 to 3, a system kitchen may include a cabinet S including a storage space R. The cabinet S may include a counter arranged on the cabinet S in a flat plate shape and capable of allowing a user to cook, and a sink provided to wash dishes or prepare ingredients.

The storage space R may be partitioned by internal partition walls, etc., and the partitioned storage space R may be opened and closed by various panels P forming a front surface of the cabinet S.

In the system kitchen, a home appliance may be provided in a built-in manner.

For example, the dishwasher 1 may be provided in the system kitchen in a built-in manner. The dishwasher 1 may be arranged in a part of the partitioned storage space R, and the storage space R in which the dishwasher 1 is arranged may be opened and closed by a front panel 90 arranged in the front surface of the dishwasher 1 among the various panels P.

For example, other than the dishwasher 1, other types of home appliances such as an oven and a microwave oven may be stored in the storage space R.

For example, the dishwasher 1 may be disposed in a storage space formed inside an art wall of an indoor space other than the system kitchen, and the storage space, in which the dishwasher 1 is stored, may be opened and closed by a panel forming the art wall.

For example, other than the dishwasher 1, other types of home appliances such as an air conditioner, a washing machine, a clothes dryer, an oven, and a microwave oven may be stored in the storage space formed inside the art wall.

For example, the dishwasher 1 may be disposed in an inner space formed inside a storage cabinet such as a furniture other than the system kitchen or the art wall, and the storage space in which the dishwasher 1 is arranged may be opened and closed by a door of the storage cabinet.

For example, other than the dishwasher 1, other types of home appliances such as an air conditioner, a washing machine, a clothes dryer, an oven, and a microwave oven may be stored in the storage space formed inside the storage cabinet.

However hereinafter the dishwasher 1 stored in the system kitchen will be described as an example, and the following features may be applied to home appliances stored in various forms described above.

The dishwasher 1 may include a tub 12 provided inside a main body 10. The tub 12 may be provided in a substantially box shape. One side of the tub 12 may be open. The tub 12 may include an opening 12a. As an example, the tub 12 may open toward a first direction X, which is the front.

The dishwasher 1 may further include a door 20 configured to open and close the opening 12a of the tub 12. The door 20 may be installed on the main body 10 to open and close the opening 12a of the tub 12. The door 20 may be rotatably installed on the main body 10 through a member such as a hinge 25. The door 20 may be detachably mounted to the main body 10.

For example, the door 20 may be rotatably hinged to a lower portion of the main body 10. An axis of rotation of the hinge 25 may extend in a second direction Y, which is a left and right direction of the main body 10, and thus the door 20 may be rotated in a front and rear direction from the front of the main body 10.

For example, the door 20 may be hinged to a hinge provided on the left or right side of the main body 10 in the second direction Y on the front side of the main body 10. The door 20 may be provided to be rotated from the second direction Y to the first direction X by hinges arranged on the left and/or right side of the main body 10.

The door 20 may include an outer surface 22 forming the outer side of the door 20 and coupled to the front panel 90, and an inner surface 21 provided to face the inside of the tub 12 when the door 20 closes the tub 12.

The dishwasher 1 may further include a storage container provided inside the tub 12 to store dishes. The storage container may include a plurality of baskets 51, 52, and 53.

The storage container may include an intermediate basket 52 positioned in the middle with respect to the height direction of the dishwasher 1, and a lower basket 51 positioned in a lower portion with respect to the height direction of the dishwasher 1. The intermediate basket 52 may be provided to be supported by an intermediate guide rack 13b. The lower basket 51 may be provided to be supported by a lower guide rack 13a. The intermediate guide rack 13b and the lower guide rack 13a may be installed on a side surface 12d of the tub 12 so as to be slidable toward the opening 12a of the tub 12. The side surface 12d of the tub 12 may include an inner surface of a right wall and an inner surface of a left wall of the tub 12.

Relatively large dishes may be stored in the lower basket 51 and the intermediate basket 52. However, the types of dishes accommodated in the lower and intermediate baskets 51 and 52 is not limited to relatively large dishes. That is, the plurality of baskets 51, 52 and 23 may accommodate not only relatively large dishes but also relatively small dishes.

The storage container may include an upper basket 53 positioned in an upper portion with respect to the height direction of the dishwasher 1. The upper basket 53 may be formed in a rack assembly to accommodate relatively small dishes. For example, the upper basket 53 may accommodate a cooking utensil such as a ladle, a knife, or a turner, or cutlery. In addition, the rack assembly may accommodate a small cup such as an espresso cup. However, the types of dishes accommodated in the upper basket 53 is not limited thereto.

The upper basket 53 may be provided to be supported by an upper guide rack 13c. The upper guide rack 13c may be installed on the side surface 12d of the tub 12. For example, the upper basket 53 may be slidably moved by the upper guide rack 13c, and inserted into or withdrawn from a washing chamber C.

The storage container is not limited to the shape shown in FIGS. 2 and 3, and the storage container may not include the upper basket 53 according to the size of the tub 12. For example, the storage container may be implemented with the intermediate basket 52 and the lower basket 53.

The dishwasher 1 may include the washing chamber C, which is a space formed inside the tub 12. The washing chamber C may be defined as an inner space of the tub 12. The washing chamber C may correspond to a space surrounded by a lower surface 12b, an upper surface 12c and the side surface 12d of the tub 12, and the inner surface 21 of the door 20 when the door 20 closes the tub 12.

The washing chamber C may refer to a space in which dishes placed in the baskets 51, 52 and 53 are washed by wash water and dried.

The dishwasher 1 may include a spray device 40 configured to spray wash water. The spray device 40 may receive wash water from a sump assembly 70.

The spray device 40 may include a plurality of spray units 41, 42, and 43.

For example, the plurality of spray units 41, 42, and 43 may include a first spray unit 41 arranged under the lower basket 51 in the height direction of the dishwasher 1, a second spray unit 42 arranged under the intermediate basket 52 in the height direction of the dishwasher 1, and a third spray unit 43 arranged above the upper basket 53 in the height direction of the dishwasher 1.

Each of the plurality of spray units 41, 42, and 43 may be configured to spray wash water while rotating. Each of the first spray unit 41, the second spray unit 42, and the third spray unit 43 may be provided to spray wash water while rotating. The plurality of spray units 41, 42 and 43 may be referred to as a plurality of spray rotors. The first spray unit 41, the second spray unit 42, and the third spray unit 43, respectively, may be referred to as a first spray rotor 41, a second spray rotor 42, and a third spray rotor 43.

However, the spray device 40 may spray the wash water in a manner different from the above-described example. For example, unlike the second spray unit 42 and the third spray unit 43, the first spray unit 41 may be fixed to one side of the lower surface 12b of the tub 12. The first spray unit 41 may be configured to spray the wash water in a substantially horizontal direction by a fixed nozzle. A direction of the wash water, which is sprayed in a substantially horizontal direction from the nozzle of the first spray unit 41, may be changed by a conversion assembly (not shown) arranged thereon and then the wash water may move upward. The conversion assembly may be installed on a rail by a holder and may be provided to be movable in translation along the rail.

The dishwasher 1 may include the sump assembly 70.

The sump assembly 70 may be provided to receive wash water. The sump assembly 70 may collect wash water of the washing chamber C. For example, the lower surface 12b of the tub 12 may be inclined downward toward the sump assembly 70 to smoothly collect water to the sump assembly 70. The wash water of the washing chamber C may flow along the slope of the lower surface 12b of the tub 12 and smoothly flow into the sump assembly 70.

The sump assembly 70 may include a circulation pump 30 configured to pump wash water stored in the sump assembly 70 to the spray device 40.

The sump assembly 70 may include a drain pump 60 configured to drain wash water and foreign substances (e.g., food residues) remaining in the sump assembly 70.

The sump assembly 70 may pump the collected wash water and supply the wash water to the spray device 40. The sump assembly 70 may be connected to the spray device 40 to supply wash water to the spray device 40.

The sump assembly 70 may be independently connected to the first spray unit 41, the second spray unit 42, and the third spray unit 43. For example, the sump assembly 70 may be independently connected to connectors connected to the first spray unit 41, the second spray unit 42, and the third spray unit 43. The connector may be provided in the shape of a connection port, a duct, or the like.

For example, the second spray unit 42 and the third spray unit 43 may be provided with one connector, and in this case, wash water supplied through the one connector may flow into a connector. Wash water flowing into the connector may be branched during moving, and the branched wash water may be provided to at least one of the second spray unit 42 and the third spray unit 43.

The dishwasher 1 may include an alternating device (not shown) configured to selectively supply wash water to the spray device 40. The alternating device (not shown) may be driven to selectively supply wash water to each connector connected to each of the spray devices 41, 42, and 43. For example, the alternating device (not shown) may selectively supply wash water to at least one of connectors connected to the first spray device 41 and a connector connected to the second spray device 42.

The dishwasher 1 may include a machine room M, which is a space provided below the tub 12. The machine room M may be a place in which a component for circulating wash water is disposed.

For example, at least a part of the sump assembly 70 may be arranged in the machine room M. Most of the sump assembly 70 may be arranged in the machine room M.

The dishwasher 1 may include a detergent box 80 configured to input detergent into the tub 12.

For example, the dishwasher 1 may include a display arranged on the front side of the dishwasher 1 to display a driving state of the dishwasher 1. However, because the front panel 90 is disposed on the front of the dishwasher 1, the display may be small or not exposed from the outside, and thus it is difficult for a user to recognize the display.

For example, due to the front panel 90 disposed on the front of the dishwasher 1, the dishwasher 1 may not include a display configured to display a state to the front side of the dishwasher 1.

For example, the dishwasher 1 may include a display apparatus 100 configured to display an image I on a floor B on which the dishwasher 1 is installed. As described above, the state of the dishwasher 1 may not be displayed forward due to the front panel 90 disposed on the front of the dishwasher 1, and thus the display apparatus 100 may display the state of the dishwasher 1 by projecting the image I on the floor B.

For example, the display apparatus 100 may be configured to allow the image I to be display on the outside by projecting light, which is emitted from a light source, to an image.

For example, the display apparatus 100 may be disposed inside the door 20.

For example, the display apparatus 100 may be disposed inside the outer surface 22 of the door 20.

For example, the display apparatus 100 may be disposed on a rear side of the front panel 90.

For example, the display apparatus 100 may be disposed outside the dishwasher 1. The display apparatus 100 may receive information about the state of the dishwasher 1 through wireless communication and display the state of the dishwasher 1 as an image I.

For example, the display apparatus 100 may be disposed on the rear side of the front panel 90 and spaced apart from the dishwasher 1.

For example, the display apparatus 100 may be disposed in a space different from the dishwasher 1. The display apparatus 100 may receive information about the state of the dishwasher 1 through wireless communication and display the state of the dishwasher 1 as an image I. For example, when the dishwasher 1 is disposed in a kitchen of an internal space, the display apparatus 100 may be disposed in a living room. For example, the display apparatus 100 may be disposed on an art wall of a living room or on an inside of a wall forming the living room so as to project an image I on the floor of the living room.

However, hereinafter a type in which the display apparatus 100 is disposed inside the outer surface 22 will be described as an example.

Figure 4:
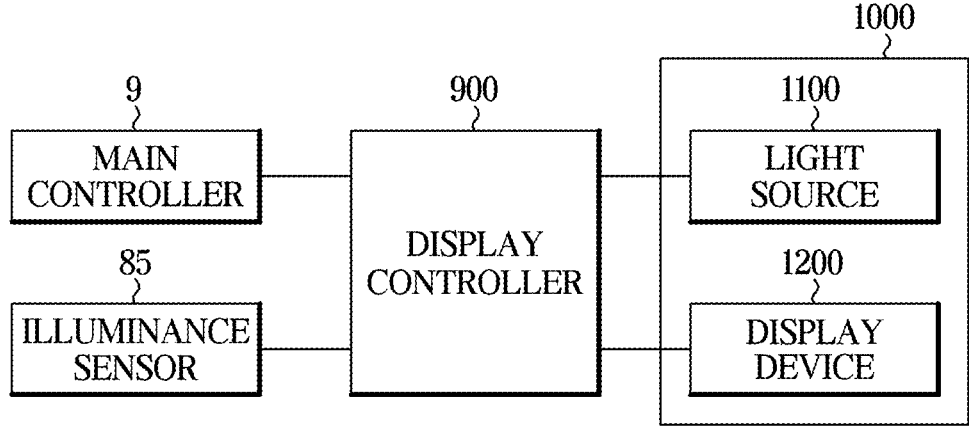
FIG. 4 is a control block diagram of the dishwasher according to an embodiment.
Figure 5:
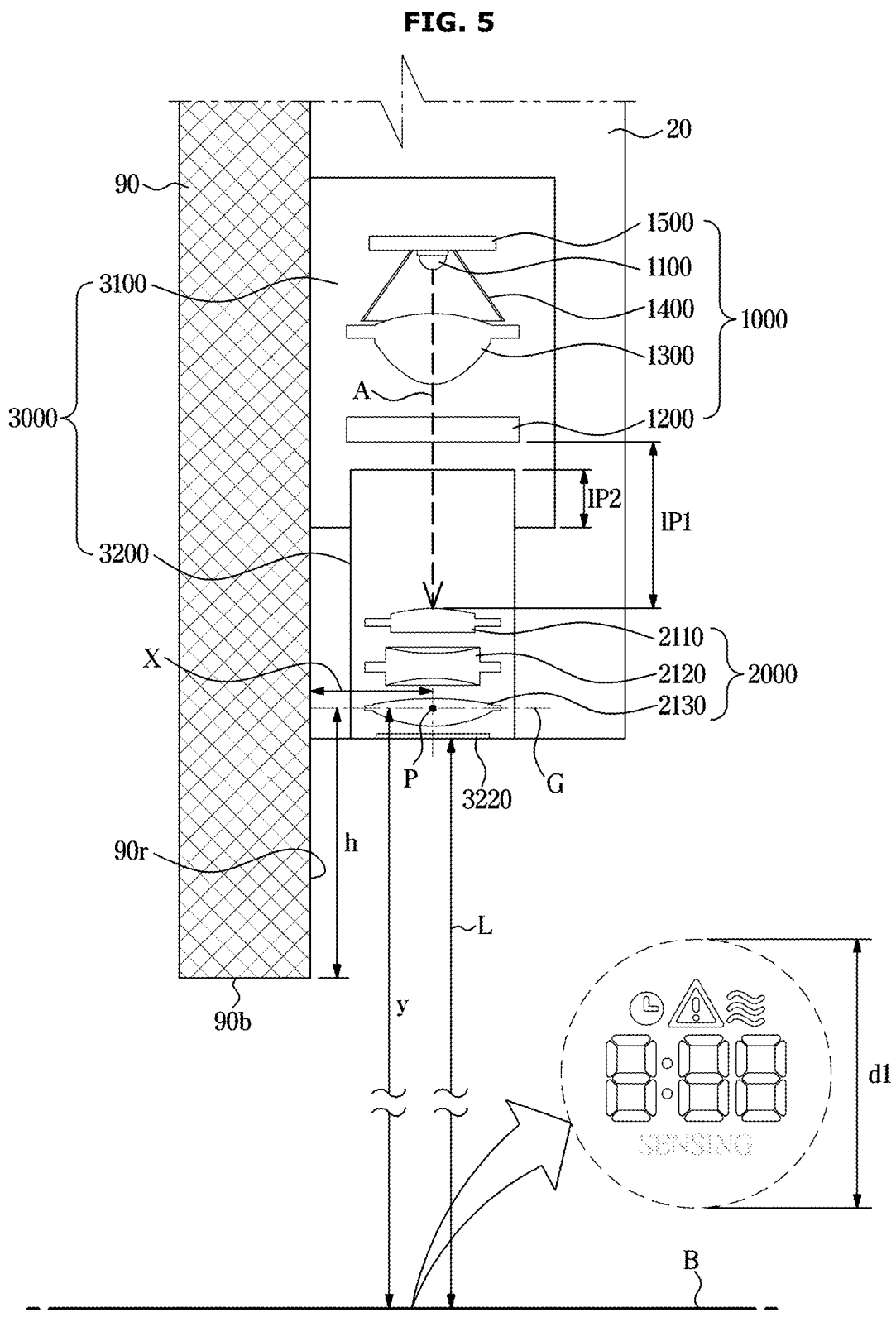
FIG. 5 is a conceptual diagram of a display apparatus according to an embodiment.
Figure 6:
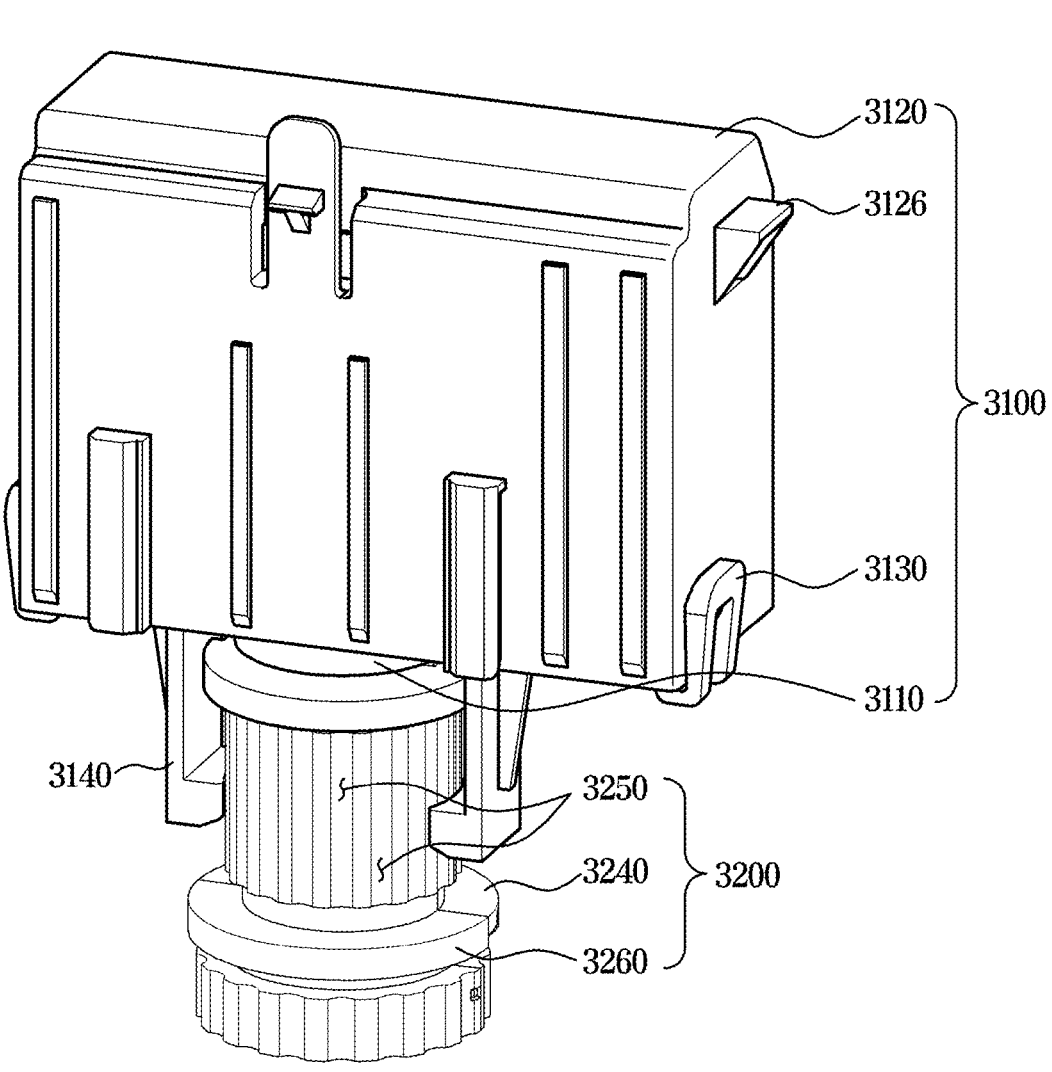
FIG. 6 is a perspective view of the display apparatus according to an embodiment.
Figure 7:
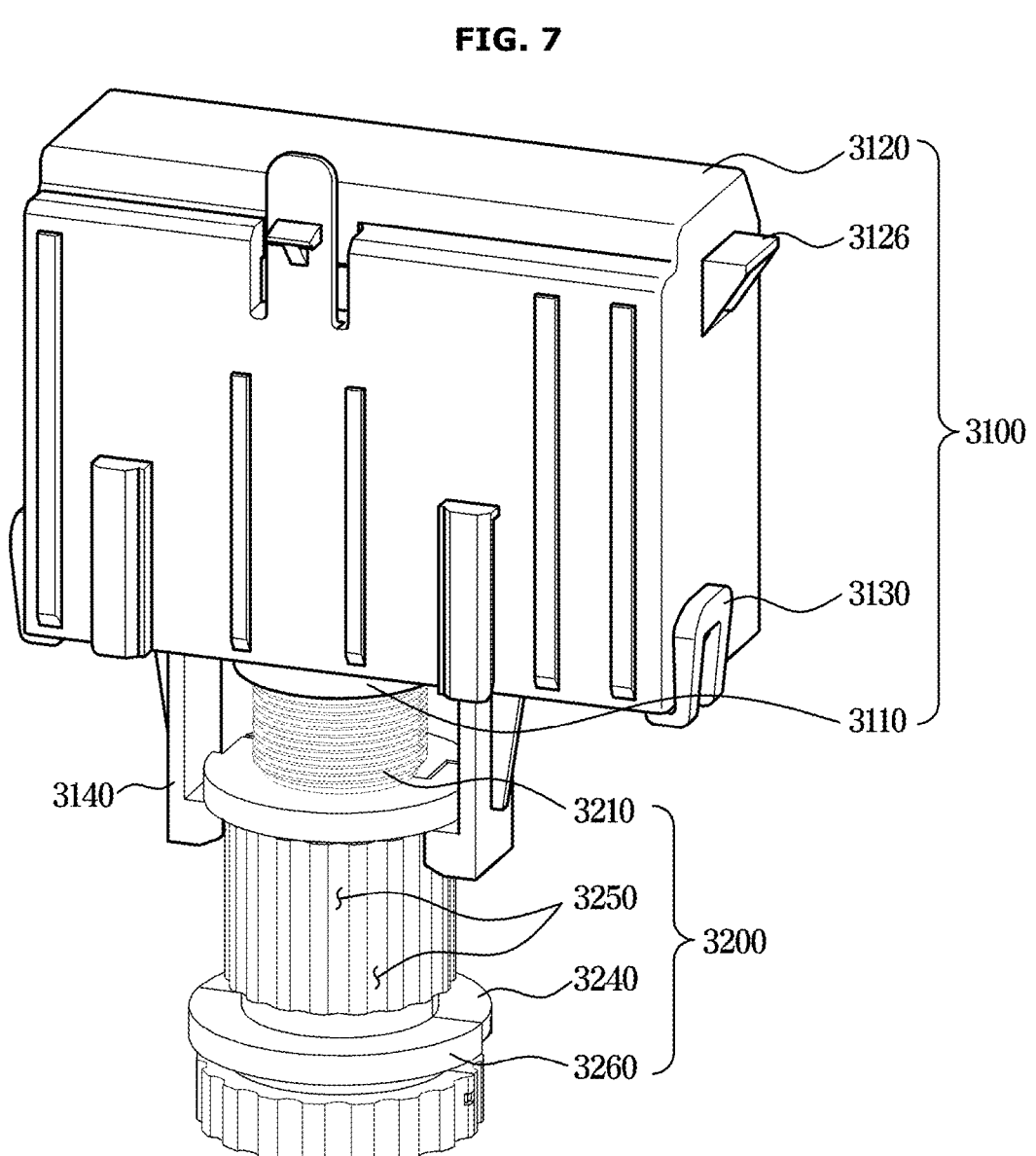
FIG. 7 is a perspective view of the display apparatus according to an embodiment.
Figure 8:
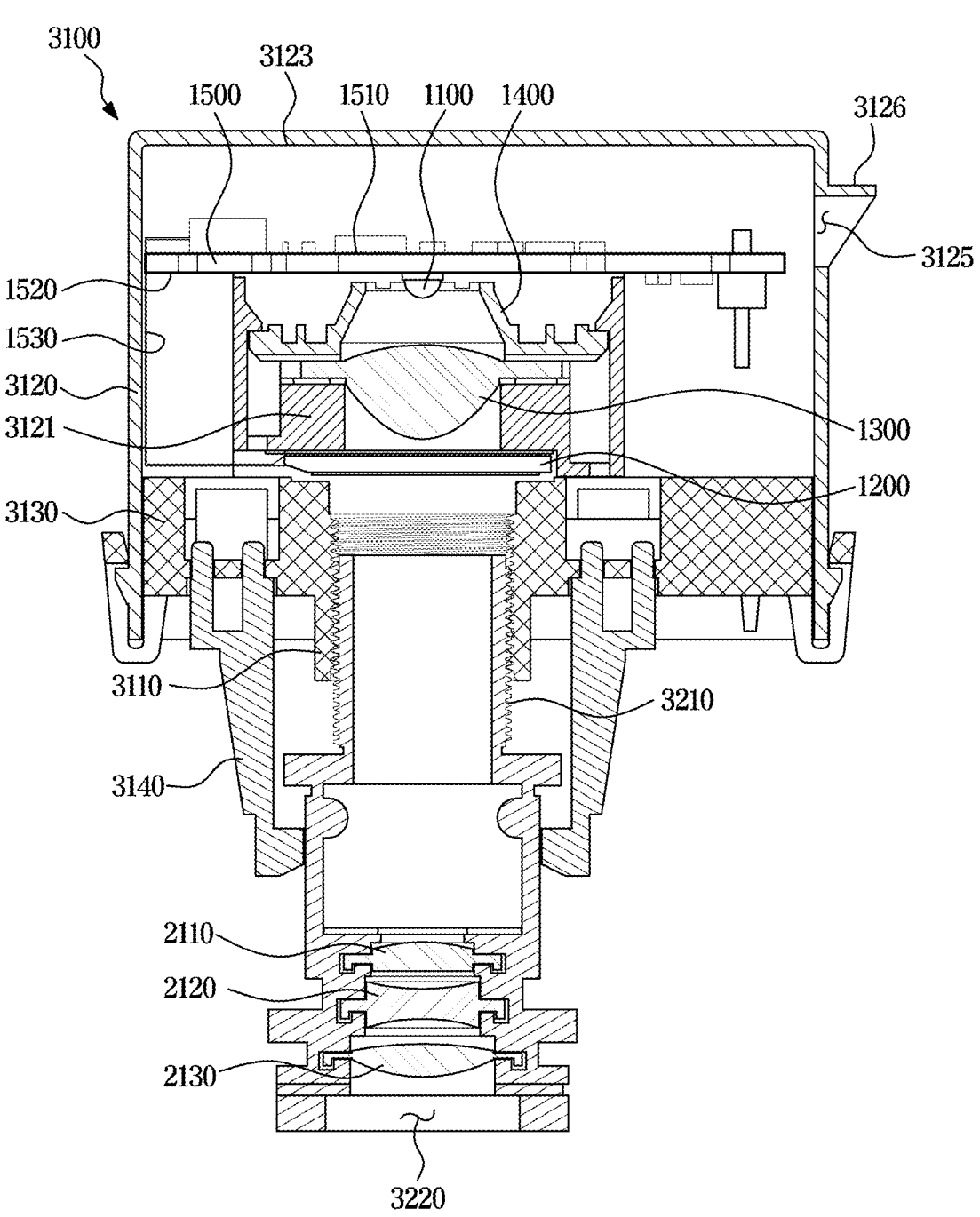
FIG. 8 is a cross-sectional view of the display apparatus according to an embodiment.

FIG. 4 is a control block diagram of the dishwasher according to an embodiment, FIG. 5 is a conceptual diagram of a display apparatus according to an embodiment, FIG. 6 is a perspective view of the display apparatus according to an embodiment, FIG. 7 is a perspective view of the display apparatus according to an embodiment, and FIG. 8 is a cross-sectional view of the display apparatus according to an embodiment.

As illustrated in FIGS. 4 and 5, the display apparatus 100 may include an image generator 1000 configured to generate an image I.

For example, the display apparatus 100 may include a display controller 900 configured to control the display apparatus 100. The display controller 900 may transmit/receive a signal with a main controller 9 of the dishwasher 1 to control the display apparatus 100 to allow the display apparatus 100 to perform an operation.

For example, the display controller 900 may be provided as part of the main controller 9 of the dishwasher 1 or provided as a separate component from the main controller 9 to communicate with the main controller 9 by wire or wirelessly.

The display controller 900 may include at least one memory and at least one processor to perform the above-described operation and an operation to be described later.

For example, the memory and the processor may be implemented as separate chips. For example, a processor may include one or more processor chips or one or more processing cores. For example, the memory may include one or two or more memory chips or one or two or more memory blocks. For example, the memory and the processor may be implemented as a single chip.

As illustrated in FIGS. 5 to 8, the image generator 1000 may include a light source 1100.

The image generator 1000 may include a display device 1200 configured to transmit light generated from the light source 1100 and configured to display an image i1.

The image generator 1000 may include an illumination lens 1300 configured to condense light generated from the light source 1100 toward the display device 1200.

The image generator 1000 may include a reflector 1400 configured to guide light generated from the light source 1100 to the illumination lens 1300.

The image generator 1000 may include a printed circuit board 1500 on which chips forming the above-described memory and processor are mounted.

The display apparatus 100 may include an adjustor 2000 including a refractive lens 2100 provided to adjust a size of an image formed by the image generator 1000.

The adjustor 2000 may be configured to adjust the size and to focus of the image I projected on the floor B by adjusting the size of an image I displayed on the display device 1200.

The adjustor 2000 may be configured to allow the image I, which has a larger size than the image I displayed on the display device 1200, to be projected onto the floor B.

The adjustor 2000 may be configured to adjust the focus of the image I projected on the floor B to increase the user's visibility of the image I.

The adjustor 2000 may be configured to adjust the focus of the image I displayed on the floor B by moving relative to the image generator 1000.

When an image generated by the image generator 1000 is transmitted through the adjustor 2000, a distance between the image generator 1000 and the adjustor 2000 may be adjusted by the movement of the adjustor 2000, and accordingly, the size and focus of the image I displayed on the floor B may be adjusted.

For example, the adjustor 2000 may be disposed below the image generator 1000 and may move relative to the image generator 1000 in the vertical direction. Accordingly, the size and focus of the image I displayed on the floor B may be adjusted.

The display apparatus 100 may include a housing 3000 in which the image generator 1000 and the adjustor 2000 are accommodated.

In the case of a display apparatus that projects an image, a projection distance of more than a predetermined distance from the display apparatus to display an image is required, and a predetermined light path lp1 between the image generator and the adjustor is required to project an image according to the projection distance.

Accordingly, in the display apparatus, a housing is formed to cover the image generator, the adjustor, and the light path lp1, respectively. As the respective housings are spaced apart from each other, a volume of the display apparatus may be increased.

In the case of a display apparatus that is a projector type to display a state of a home appliance, the display apparatus is configured to project an image to a lower side of the home appliance and thus it is appropriate that the display apparatus is disposed in a lower portion of a front surface of the home appliance, particularly, an inside of a door of the home appliance or an inside of a panel of the home appliance forming the front surface.

At this time, when a volume of the display apparatus increases, it is difficult to arrange the display apparatus to the inside of the door or the inside of the panel of the home appliance.

When the light path lp1 between the image generator and the adjustor is reduced or limited to a certain length for reducing the volume of the display apparatus, the resolution of the image displayed on the floor may be reduced because a focal range of the image displayed on the floor is limited. Further, a location on which the display apparatus is installed is limited, and thus there is difficulty in installing the display apparatus.

For example, the display apparatus 100 may be provided in such a way that the image generator 1000, the adjustor 2000, and the light path lp1 between the image generator 1000 and the adjustor 2000 are all arranged in the housing 3000 formed as a unit. Therefore, it is possible to ease the above-mentioned difficulty.

The volume of the display apparatus 100 is minimized by the housing 3000 that is formed as a unit. Accordingly, the display apparatus 100 may be easily installed inside the door 20.

The housing 3000 may be provided in such a way that the adjustor 2000 is configured to move relative to the image generator 1000 so as to change a distance between the image generator 1000 and the adjustor 2000.

Accordingly, the resolution and size of the image I displayed on the floor B may be adjusted by adjusting the distance between the image generator 1000 and the adjustor 2000 even in various installation positions of the display apparatus 100 in the vertical direction. For example, the distance between the image generator 1000 and the adjustor 2000 may be adjusted in a plurality of steps or continuously.

Particularly, the housing 3000 may include a first housing 3100 on which the image generator 1000 is mounted and a second housing 3200 on which the adjustor 2000 is mounted.

For example, all components forming the image generator 1000 may be installed inside the first housing 3100.

For example, all components forming the adjustor 2000 may be installed inside the second housing 3200.

The second housing 3200 may be coupled to the first housing 3100 so as to move relative to the first housing 3100.

For example, the second housing 3200 may be disposed below the first housing 3100.

For example, the second housing 3200 may be coupled to the first housing 3100 from the lower side to the upper side of the first housing 3100 with respect to the vertical direction. For example, the first housing 3100 may be disposed above the second housing 3200 with respect to the vertical direction.

For example, the second housing 3200 may be provided to move with respect to the first housing 3100.

For example, the second housing 3200 may move relative to the first housing 3100 with respect to the relative vertical direction.

Accordingly, all components forming the image generator 1000 are disposed inside the first housing 3100 and all components forming the adjustor 2000 are disposed inside the second housing 3200. Further, the first housing 3100 and the second housing 3100 are configured to be coupled to each other. Therefore, the housing 3000 may accommodate all configurations of the display apparatus 100, thereby minimizing the volume of the display apparatus 100.

In addition, as the second housing 3200 moves relative to the first housing 3100, the adjustor 2000 disposed inside the second housing 3200 may be configured to move relative to the image generator 1000 disposed inside the first housing 3100. Therefore, it is possible to easily adjust the size and resolution of the image I displayed on the floor B.

Light may be provided to be emitted from the first housing 3100 to the second housing 3200 in an extension direction of an optical axis A, and the image I formed in the display apparatus 100 may be projected to the outside through the second housing 3200. Accordingly, the second housing 3200 may include a projection hole 3220 through which the image I is projected from the display apparatus 100.

For example, the projection hole 3220 may be provided to open downward. For example, the optical axis A may be formed to extend downward from the light source 1100 toward the projection hole 3220.

The light source 1100, the illumination lens 1300, and the display device 1200 may be sequentially arranged from the top in the vertical direction inside the first housing 3100.

The reflector 1400 may be disposed between the light source 1100 and the illumination lens 1300 with respect to the vertical direction.

For example, the light source 1100 may be provided to be mounted on the printed circuit board 1500. For example, the light source 1100 may be provided to be mounted on a lower surface 1520 of the printed circuit board 1500 in the vertical direction. For example, in the first housing 3100, the printed circuit board 1500 may be disposed above the reflector 1400, the illumination lens 1300, and the display device 1200 with respect to the vertical direction.

For example, the printed circuit board 1500, on which the light source 1100 is mounted, the reflector 1400, the illumination lens 1300, and the display device 1200 may be sequentially disposed from the top in the vertical direction inside the first housing 3100.

For example, the printed circuit board 1500 may be disposed inside the first housing 3100 to allow a surface, on which the light source 1100 is mounted, to face downward.

For example, because the second housing 3200 is disposed below the first housing 3100 with respect to the vertical direction, the refractive lens 2100 may be disposed below the light source 1100, the illumination lens 1300, and the display device 1200 with respect to the vertical direction.

The light source 1100, the illumination lens 1300, the display device 1200, and the refractive lens 2100 may be sequentially disposed from the top in the vertical direction.

For example, because the light source 1100 is disposed on the lower surface 1520 of the printed circuit board 1500, the light source 1100 may be provided to emit light downward. Light emitted from the light source 1100 may be provided to sequentially pass through the illumination lens 1300, the display device 1200, and the refractive lens 2100.

Accordingly, the light source 1100, the illumination lens 1300, the display device 1200, and the refractive lens 2100 may be sequentially arranged around the optical axis A of the light emitted from the light source 1100.

The second housing 3200 may be configured to move relative to the first housing 3100 in the direction of the optical axis A. For example, the optical axis A of the display apparatus 100 may be formed from an upper side to a lower side according to the arrangement of the light source 1100, and the second housing 3200 may be configured to move vertically.

In a state in which the light source 1100, the illumination lens 1300, the display device 1200, and the refractive lens 2100 are sequentially arranged in the direction of the optical axis A, the refractive lens 2100 may be configured to move relative to the light source 1100, the illumination lens 1300, the display device 1200 along the optical axis A according to the relative movement of the second housing 3200.

Because the second housing 3200 moves relative to the first housing 3100 with respect to the optical axis A, the adjustor 2000 may be configured to move relative to the image generator 1000 in a state in which the image generator 1000 disposed inside the first housing 3100 is fixed.

The image I may be projected from the display apparatus 100 to the floor B while light is transmitted through each component along the optical axis A. The size and resolution of the image I may vary according to a length of the light path lp1 between the refractive lens 2100 and the display device 1200, and a throw distance L that is from the display apparatus 100 to a point where the image I is projected. The point where the image I is projected from the display apparatus 100 is the floor B, and as the throw distance L is formed constant, the size and resolution of the image I may be adjusted according to the length of the light path lp1 between the display device 1200 and the refractive lens 2100.

As for the location of the display device 1200 and the reflective lens 2100 that determines the length of the light path lp1, the display apparatus 100 may be configured to allow the location of the reflective lens 2100 to move according to the movement of the second housing 3200 in a state in which the location of the display device 1200 is fixed.

Particularly, as the second housing 3200 moves relative to the first housing 3100 with respect to the optical axis A, the refractive lens 2100 may move relative to the display device 1200 with respect to the optical axis A. Accordingly, the light path lp1 between the display device 1200 and the refractive lens 2100 may be easily changed through the movement of the second housing 3200.

That is, the resolution and size of the image I displayed on the floor B may be adjusted by simply moving the second housing 3200 relative to the first housing 3100, and accordingly, the volume of the display apparatus 100 may be minimized because an additional configuration or space for adjusting the resolution and size of the image I is unnecessary.

As illustrated in FIGS. 6 and 7, the second housing 3200 may be provided in a barrel shape and disposed adjacent to or away from the first housing 3100 by rotation.

For example, the second housing 3200 may be rotated in one direction and moved upward, and accordingly, the second housing 3200 may be disposed adjacent to the first housing 3100 to reduce the light path lp1.

For example, the second housing 3200 may be rotated in the opposite direction and moved downward, and accordingly, the second housing 3200 may be disposed away from the first housing 3100 to increase the light path lp1.

For example, the first housing 3100 may include a female screw member 3110 including a screw thread formed at a predetermined angle, and the second housing 3200 may include a male screw member 3210 provided to be inserted into the female screw member 3110 and movable by including a screw thread corresponding to the screw thread of the female screw member 3110.

A user can adjust the distance between the second housing 3200 and the first housing 3100 by rotating the second housing 3200, and accordingly, the light path lp1 may be adjusted and thus the focus of the image I may be adjusted.

While the second housing 3200 moves linearly on the extension direction of the optical axis A through the rotation of the second housing 3200, the distance between the display device 1200 and the refractive lens 2100 may be changed and thus the focus of the image I may be adjusted.

In addition, the light source 1100 of the display apparatus 100 may be configured to emit light so as to supply light to the display device 1200 as the second housing 3200 moves in the vertical direction.

For example, the light source 1100 may be provided as a light emitting diode (LED).

A brightness of the image I may be determined according to an output of the light source 1100, a light transmittance of the display device 1200, the efficiency of light use in the adjustor 2000, and the length of the projection distance between the display apparatus 100 and the floor B.

In addition, even when the image I maintains a constant brightness, the visibility of the image I may vary depending on the brightness around the floor B and the degree of reflectance or gloss of the floor B.

Accordingly, with the consideration that the brightness of the image I varies depending on the environment around the image I and that the length of the projection distance between the display apparatus 100 and the floor B varies, the light source 1100 may emit light with a predetermined output value to allow the image I to be displayed on the floor B with a brightness that is adjustable within a certain range.

For example, the light source 1100 may emit light to allow the brightness of the image I displayed on the floor B to be approximately 50 lx to 600 lx.

For example, the dishwasher 1 may include an illuminance sensor 85. For example, the illuminance sensor 85 may be provided as one component of the display apparatus 100.

For example, the illuminance sensor 85 may sense the brightness of the floor B on which the image I is displayed. For example, the display controller 9000 may control the output of the light source 1100 based on the value sensed by the illuminance sensor 85.

The light source 1100 may be mounted on the printed circuit board 1500 to receive power, and the on/off and output levels of the light source 1100 may be controlled through the display controller 9000. For example, the light source 1100 may be mounted on the lower surface 1520 of the printed circuit board 1500 with respect to the vertical direction and thus the light source 1100 may emit light downward.

For example, the printed circuit board 1500 may be arranged to allow mounting surfaces on both sides to be disposed in the vertical direction inside the first housing 3100. For example, the printed circuit board 1500 may be disposed in such a way that a longitudinal direction of the printed circuit board 1500 is directed in the left and right direction Y.

For example, a chip may be disposed on an upper surface 1510 of the printed circuit board 1500 and the light source 1100 may be disposed on the lower surface 1520.

For example, a cable 1530 provided to electrically connect a chip and the display device 1200 may be connected to the printed circuit board 1500.

For example, the printed circuit board 1500 may be electrically connected to the main board forming the main controller 9 of the dishwasher 1 through the cable.

For example, the printed circuit board 1500 may be equipped with a communication device for wireless communication with the main board or may be connected to the communication device.

For example, through the cable, the printed circuit board 1500 may be electrically connected to a power supplier configured to supply power to the printed circuit board 1500.

The reflector 1400 may be disposed between the light source 1100 and the illumination lens 1300 with respect to the vertical direction.

The reflector 1400 may be provided to reflect light, which is emitted from the surface of the light source 1100 at an angle greater than or equal to a predetermined angle, so as to guide the light to the illumination lens 1300.

For example, the reflector 1400 may be provided in a cylindrical shape extending in the vertical direction and including a hollow.

For example, the reflector 1400 may be provided in a polygonal column shape extending in the vertical direction and including a hollow.

For example, the reflector 1400 may be provided in a shape in which a cross-sectional area increases from an upper opening 1410, in which the light source 1100 is disposed, to a lower opening 1420 in which the illumination lens 1300 is disposed.

For example, the lower opening 1420 of the reflector 1400 may have a larger diameter than an aperture of the illumination lens 1300. This is to prevent a case, in which a part of the light reflected inside the reflector 1400 is additionally reflected inside the reflector 1400 without being transmitted through the illumination lens 1300, so as to prevent a reduction in the light efficiency.

For example, the inside of the reflector 1400 may be formed of a metal material.

For example, the inside of the reflector 1400 may be formed of a plastic material, and the outside of the reflector 1400 may be provided with a reflective coating.

For example, the inside of the reflector 1400 may be formed of a white material or painted in white.

The illumination lens 1300 may be provided to allow light to be uniformly emitted to an entire area of a display region of the display device 1200.

For example, the illumination lens 1300 may be provided to allow light to be vertically transmitted through the display region of the display device 1200.

For example, the illumination lens 1300 may be provided as a double-convex lens.

For example, the illumination lens 1300 may be provided to allow light to be emitted to the display device 1200 with a uniformity of 90% or more over the entire display region of the display device 1200. This is to minimize the luminance deviation of the image I projected on the floor B.

The light source 1100, the illumination lens 1300, and the display device 1200 may be sequentially arranged with respect to the optical axis A so as to allow the distance between the display device 1200 and the illumination lens 1300 to be less than the distance between the illumination lens 1300 and the light source 1100 with respect to the optical axis A. This is because it is easy for the light to vertically pass through the display region of the display device 1200 as the illumination lens 1300 is closer to the display device 1200.

For example, when a lens surface, which faces the light source 1100, of the illumination lens 1300 is defined as a first lens surface and a lens surface facing the display device 1200 is defined as a second lens surface, a curvature of the first lens surface may be provided to be greater than a curvature of the second lens surface. When the distance between the display device 1200 and the illumination lens 1300 is less than the distance between the illumination lens 1300 and the light source 1100, it is easy for the light to vertically pass through the display region of the display device 1200.

A light emitting area of the reflective lens 1300 with respect to a radial direction may be greater than an area of the display region of the display device 1200. When a center of the illumination lens 1300 and a center of the display region of the display device 1200 are arranged on the same line based on the center of the optical axis A, the display region of the display device 1200 in the radial direction of the optical axis A may be arranged inside the illumination lens 1300.

This is because the light is vertically emitted to the entire display region when the light emitting area of the reflective lens 1300 is greater than the area of the display region of the display device 1200. It is appropriate that the light emitting area of the illumination lens 1300 is 1.1 to 1.5 times larger than the display region of the display device 1200.

For example, the lens surface of the illumination lens 1300 may be provided as an aspheric surface. By adjusting a refractive index of light incident on an edge of the illumination lens 1300, a light output efficiency of the edge of the illumination lens 1300 may be increased, and accordingly, the uniformity of the amount of light incident on the display region of the display device 1200 may be increased.

For example, the illumination lens 1300 may be formed of polycarbonate (PC) material.

For example, the illumination lens 1300 may be formed of Polymethyl methacrylate (PMMA) material.

For example, the illumination lens 1300 may be formed of a glass material.

The display device 1200 may be provided to display information of the image I. As the light emitted from the light source 1100 passes through the display device 1200, an image displayed on the display device 1200 may be displayed on the image I projected onto the floor B.

For example, the display device 1200 may be provided as a liquid crystal display (LCD).

For example, the display device 1200 may be provided in the form of a film on which images, numbers, etc. are printed.

The display device 1200 may be provided to display a remaining operation time of the dishwasher 1, a contamination level, a reservation status, an error, an operating state, and the like. The display device 1200 may be configured to receive numbers, images, symbols, etc. and to display the numbers, images, symbols, etc. on the image I.

For example, the display device 1200 may be provided as an LCD, and a color filter may be included in the LCD so as to display various colors on the image I.

For example, the display device 1200 may be provided with an LCD, and it is appropriate that a diameter or width of the LCD is provided approximately 10 mm, and the display apparatus 100 may be configured to allow the image I displayed on the floor to be projected with a diameter greater than the diameter of the LCD.

For example, when the diameter or width of the LCD is provided approximately 10 mm and the light source 1100 is provided as an LED, the distance between the light source 1100 and the display region of the display device 1200 may be approximately 15 mm to 20 mm in consideration of the Lambertian distribution on a light emitting surface of the light source 1100. This is to maximize light efficiency emitted from the light source 1100 in consideration of the Lambertian distribution. For example, the illumination lens 1300 may be disposed within a distance between the light source 1100 and the display region of the display device 1200, and the distance between the illumination lens 1300 and the display region of the display device 1200 may be approximately 0.5 mm to 1.5 mm. This is to increase the efficiency of condensing light to the display device 1200 according to the refraction of the illumination lens 1300.

For example, the display device 1200 may be provided as an LCD, and the display device 1200 may include a 7-segment LCD to display numbers. For example, in a 7-segment LCD, a total area of segments displaying numbers may be 75% or more of the total display region of the 7-segment LCD. This is to maintain the brightness of the image I above a predetermined value by securing the area of the segment in the 7-segment LCD to a predetermined value or more.

The refractive lens 2100 may be configured to adjust the size and resolution of the image I projected onto the floor B.

A curvature, a thickness, a material, a position of the refractive lens 2100 may be variously set according to the size of the display region of the display device 1200, a target size of the image I, and a target resolution of the image I.

For example, the refractive lens 2100 may be provided in plurality according to the target size of the image I and the target resolution of the image I. For example, it is appropriate that the refractive lens 2100 includes 1 to 5 refractive lenses.

For example, the refractive lens 2100 may include a first refractive lens 2110 disposed most adjacent to the display apparatus, a second refractive lens 2120 disposed below the first refractive lens, and a third refractive lens 2130 disposed below the second refractive lens.

For example, the first refractive lens 2110 may be configured to allow light projected from the display device 1200 to travel in parallel while passing through the first refractive lens 2110.

The first refracting lens 2110 may include a first lens surface 2111 facing the display device 1200 and a second lens surface 2112 facing the first lens surface 2111.

For example, the first lens surface 2111 of the first refractive lens 2110 may be provided as a surface convex toward the display device 1200. The second lens surface 2112 of the first refractive lens 2110 may be provided as a flat surface.

For example, the second refractive lens 2120 may be provided as a concave lens.

For example, the second refractive lens 2120 may be configured to allow a bundle of light, which passes through the first refractive lens 2110, to expand.

For example, the third refractive lens 2130 may be provided as a convex lens.

For example, the third refractive lens 2130 may be configured to allow light, which passes through the second refractive lens 2120, to be condensed and to allow the image I to be displayed on the floor B.

For example, the light passing through the display device 1200 may sequentially pass through the first refractive lens 2110, the second refractive lens 2120, and the third refractive lens 2130 and be projected onto the floor B.

For example, through the first refractive lens 2110, the second refractive lens 2120, and the third refractive lens 2130, the display apparatus 100 may be configured to allow the image I to be display on the floor B with an area greater than the area of the display region of the display device 1200.

For example, it is appropriate that each of the first refractive lens 2110, the second refractive lens 2120, and the third refractive lens 2130 has a thickness of 2.5 mm or more.

For example, the curvature of each lens surface of the first refractive lens 2110, the second refractive lens 2120, and the third refractive lens 2130 may be provided to be 10 mm or more.

For example, the refractive lens 2100 may be formed of Polycarbonate (PC) material.

For example, the refractive lens 2100 may be formed of Polymethyl methacrylate (PMMA) material.

For example, the refractive lens 2100 may be formed of a glass material.

For example, the refractive lens 2100 may include a Cyclic Olefin Copolymers (COC) material.

The dishwasher 1 may be not exposed to the outside of the front panel 90 for the aesthetic design, and thus a lower end 90b of the front panel 90 may be lower than a lower end 20b of the door 20 of the dishwasher 1 with respect to the vertical direction. Further, the display apparatus 100 may be disposed on the rear side of the front panel 90 in the front and rear direction, and as the display apparatus 100 is disposed inside the door 20, the display apparatus 100 may be configured to emit light to the floor B from a position higher than the lower end 20b of the door 20 with respect to the vertical direction.

A portion of the light projected from the display apparatus 100 may be blocked by the lower end 20b of the door 20, and thus a part of the image I projected on the floor B may not be displayed. To prevent this, when an area of the display region of the display device 1200 is defined as d1, a height y of the third refractive lens 2130 from the floor B, a height h of the third refractive lens 2130 from the lower end 90b of the front panel 90, an aperture D of the third refractive lens 2130, and a distance x between the aperture D of the third refractive lens 2130 and the center of the aperture D of the third refractive lens 2130 from the rear end 90r of the front panel 90 in the front and rear direction may be provided to satisfy an equation of $d1=2y/h*(x-D/2)+D$.

For example, D is defined as the aperture of the third refractive lens 2130, but may be defined as an aperture of a lens including the largest aperture among the plurality of refractive lenses 2100. For example, among the plurality of refractive lenses 2100, the third refractive lens 2130 has the largest aperture, and thus D is defined as the aperture of the third refractive lens 2130. However, when the second refractive lens 2120 has an aperture greater than the aperture of the third refractive lens 2130, D may be defined as the aperture of the second refractive lens 2120.

Hereinafter the housing 3000 will be described in detail.

Figure 9:
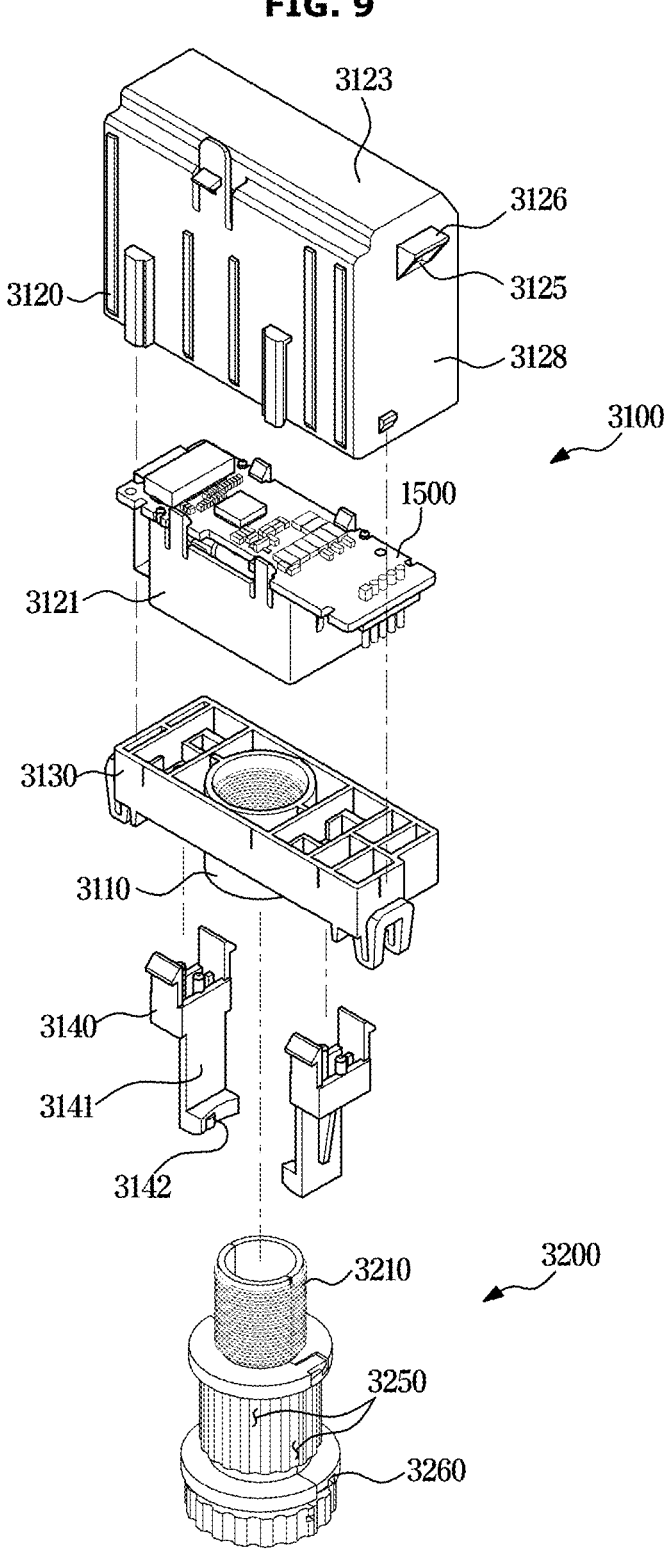
FIG. 9 is an exploded perspective view of a housing of the display apparatus according to an embodiment.
Figure 10:
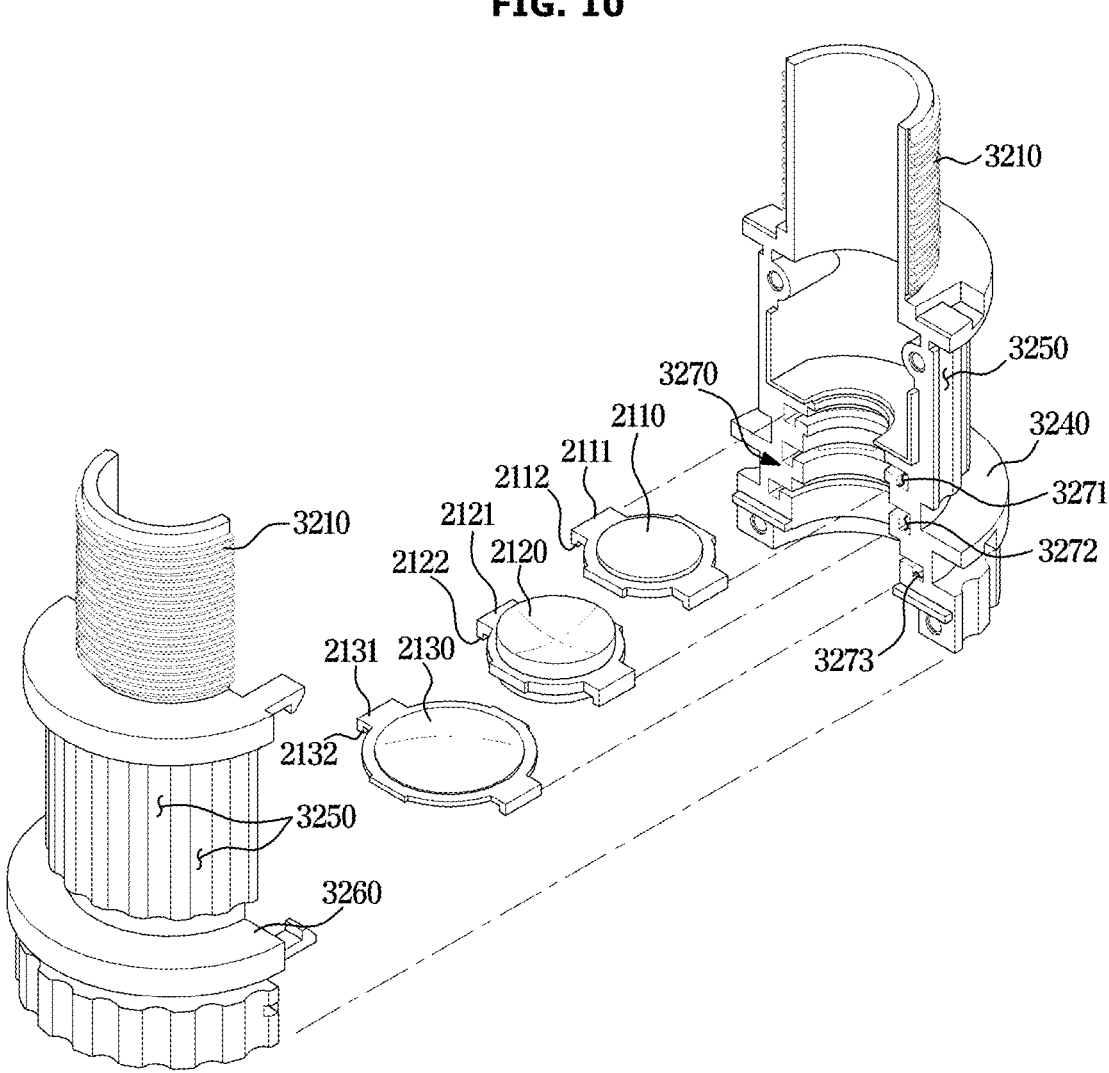
FIG. 10 is an exploded perspective view of a second housing of the display apparatus according to an embodiment.

FIG. 9 is an exploded perspective view of a housing of the display apparatus according to an embodiment, and FIG. 10 is an exploded perspective view of a second housing of the display apparatus according to an embodiment.

As described above, the display apparatus 100 may be provided in such a way that the image generator 1000, the adjustor 2000, and the light path lp1 between the image generator 1000 and the adjustor 2000 are all arranged in the housing 3000 formed as a unit. Therefore, it is possible to minimize the volume of the display apparatus 100 and thus the display apparatus 100 may be disposed on the rear side of the front panel 90 or between the doors 20.

The first housing 3100 may include a first case 3120 and a second case 3130 to allow components forming the image generator 1000 to be accommodated inside the first housing 3100. The first case 3120 and the second case 3130 may be detachably coupled to each other. In a state in which the first case 3120 and the second case 3130 are separated, the components forming the image generator 1000 may be accommodated in the first case 3120 or the second case 3130, and the components forming the image generator 1000 may be disposed in the first housing 3100 by coupling the first case 3120 and the second case 3130.

For example, the first case 3120 and the second case 3130 may be coupled in the vertical direction. For example, the first case 3120 may be disposed on the upper side and the second case 3130 may be disposed on the lower side of the first case 3120.

For example, the first case 3120 may be provided in such a way that an upper surface 3123 is sealed and a lower surface is open. For example, the second case 3130 may be coupled to the opened lower surface of the first case 3120, thereby forming the first housing 3100.

For example, because the upper surface 3123 of the first case 3120 is sealed, it is possible to prevent moisture from entering the housing 3000 even when condensation occurs inside the door 20 of the dishwasher 1 on the upper side of the first housing 3100.

For example, the printed circuit board 1500, the light source 1100, the illumination lens 1300, the reflector 1400, and the display device 1200 may be disposed inside the first case 3120.

For example, the printed circuit board 1500 may be disposed in an upper portion of the inside of the first case 3120. As the upper surface 3123 of the first case 3120 is sealed, it is possible to prevent external moisture from entering the printed circuit board 1500.

For example, the first case 3120 may include a fixing member 3121 disposed inside the first case 3120, and configured to fix the printed circuit board 1500, the reflector 1400, the illumination lens 1300, and the display device 1200 inside the first case 3120.

For example, the printed circuit board 1500 may be fixed to an upper side of the fixing member 3121.

For example, the light source 1100, the illumination lens 1300, and the reflector 1400 may be disposed inside the fixing member 3121.

For example, the display device 1200 may be fixed to the lower side of the fixing member 3121.

For example, the fixing member 3121 may be provided to be coupled with the second case 3130.

Each component may be fixed to the inside of the first case 3120 by the fixing member 3121, and as the second case 3130 and the first case 3120 are coupled, each component may be disposed inside the first housing 3100 while being fixed to the fixing member 3121.

For example, the first case 3120 may include an outlet 3125 for discharging heat generated from the light source 1100. The printed circuit board 1500 and the light source 1100 may be damaged because the temperature inside the first housing 3100 rises due to the heat generated from the light source 1100. However, it is possible to circulate the heat through the outlet 3125 and to reduce the internal temperature of the first housing 3100 by heat dissipation through the heat circulation.

For example, the outlet 3125 may be disposed at a higher position than the printed circuit board 1500 to enable heat circulation. For example, the outlet 3125 may be provided in a shape in which a part of the first case 3120 is opened on an upper part of the first case 3120 so as to be disposed adjacent to the light source 1100. This is because the printed circuit board 1500 is disposed on the inner upper side of the first case 3120.

For example, an eave 3126 may be provided on the upper side of the outlet 3125 to prevent penetration of moisture from the outside.

For example, a chamfer 3124 may be included between the upper surface 3123 of the first case 3120 and a side surface 3128 extending downward from an edge of the upper surface 3123. This is to prevent moisture from accumulating on the upper surface 3123 when moisture flows into the display apparatus 100 due to water leakage inside the door 20. The chamfer 3124 may be provided to allow moisture introduced to the upper surface 3123 to flow to the lower portion of the first housing 3100 through the chamfer 3124.

The female screw member 3110 including a screw thread formed at a predetermined angle may be disposed in the second case 3130.

For example, the female screw member 3110 may be disposed in the lower portion of the second case 3130 and open downward.

The female screw member 3110 may include a hollow 3111 to allow the male screw member 3210 to be inserted into the female screw member 3110 and rotated. Light transmitted from the display device 1200 may be emitted to the second housing 3200 through the hollow 3111.

For example, the female screw member 3110 may be provided to extend from the upper end of the second case 3130 to the rear end. For example, the female screw member 3110 may be provided in a cylindrical or polygonal shape including the hollow 3111. For example, the display device 1200 may be disposed on the upper end of the female screw member 3110 to allow light transmitted from the display device 1200 to be directly emitted into the hollow 3111 of the female screw member 3110.

For example, the second housing 3200 may be provided in a barrel shape. For example, the second housing 3200 may be provided in a cylindrical or polygonal shape including a hollow.

The male screw member 3210 may be disposed in the upper portion of the second housing 3200 and thus when the male screw member 3210 is inserted into the female screw member 3110, the second housing 3200 may be coupled to the first housing 3100.

The second housing 3200 may include a lens accommodating member 3270 disposed under the male screw member 3210 and provided to accommodate the plurality of refractive lenses 2110, 2120, and 2130 inside the second housing 3200.

For example, the second housing 3200 may include a plurality of grooves 3250 extending in the direction of the optical axis A on an outer circumferential surface in which the lens accommodating member 3270 is disposed.

The plurality of grooves 3250 may have a shape 3250 in which a concave-convex shape or a groove-protrusion shape are repeated on the outer circumferential surface of the second housing 3200 in a circumferential direction of the second housing 3200 and provided to be disposed spaced apart from each other to be longer than an adjustable length lp2 along the direction of the optical axis A.

A user can adjust the height of the second housing 3200 by rotating the second housing 3200 to focus the image I. When the second housing 3200 is rotated, the male screw member 3210 may move upward or downward through the screw thread in the female screw member 3110, and thus the length of the light path lp1 may be adjusted.

The second housing 3200 may include a handle 3260 that protrudes in a radial direction of the second housing 3200 to allow a user to easily grip the second housing 3200.

For example, the handle 3260 may have an annular shape and more protrude than the outer circumferential surface of the lens accommodating member 3270 in the radial direction of the second housing 3200.

For example, the handle 3260 may protrude in the radial direction of the second housing 3200.

For example, the handle 3260 may be disposed lower than a stopper 3140 to be described later inserted into the lower portion of the plurality of concavo-convex grooves 3250 in the direction of the optical axis A.

For example, the handle 3260 may be disposed below the lens accommodating member 3270 in the vertical direction. For example, the handle 3260 may be disposed above the lens accommodating member 3270 in the vertical direction. For example, the handle 3260 may be disposed on the lens accommodating member 3270 in the vertical direction.

The male screw member 3210 may move upward or downward on the female screw member 3110 through rotation by the adjustable length lp2, and thus the length of the light path lp1 may be adjusted by the change in the length of the adjustable length lp2.

The adjustable length lp2 may be substantially equal to or less than the length of the male screw member 3210 in the vertical direction.

The concave-convex grooves 3250 may be provided equal to or greater than the focus adjustable length lp2 in the direction of the optical axis A in the vertical direction.

The first housing 3100 may include the stopper 3140 provided to restrict the arbitrary rotation of the second housing 3200 relative to the first housing 3100.

For example, the stopper 3140 may be detachably provided in the first housing 3100. For example, the stopper 3140 may be provided to be coupled to the second case 3130. For example, the stopper 3140 may be integrally formed with the second case 3130. Alternatively, the stopper 3140 may be integrally formed with the first case 3120.

For example, one or more stoppers 3140 may be provided. For example, the stopper 3140 may be provided as a pair. For example, the pair of stoppers 3140 may be in contact with both ends of the outer circumferential surface of the lens accommodating member 3270 in the direction of 180 degrees and thus the pair of stoppers 3140 may prevent the second housing 3200 from being rotated beyond the user's intended position.

For example, three or more stoppers 3140 may be provided. For example, the plurality of stoppers 3140 may be spaced apart from each other in a circumferential direction of an outer circumferential surface of the lens accommodating member 3270 and provided to be in contact with the lens accommodating member 3270.

For example, the stopper 3140 may prevent the second housing 3200 from being arbitrarily rotated by a force applied to the second housing 3200.

For example, a user can rotate the second housing 3200 by applying a greater force to the lens accommodating member 3270 than a force due to tension between the stopper 3140 and the lens accommodating member 3270.

For example, the stopper 3140 may include an arm 3141 extending in the direction of the optical axis A and an insertion protrusion 3142 disposed on the lower side of the arm 3141 and provided to be inserted into one of plurality of concave-convex grooves 3250.

For example, the arm 3141 may be formed of an elastic material. A state in which the insertion protrusion 3142 is inserted into the groove may be maintained by elasticity of the arm 3141 in a state in which the insertion protrusion 3142 is inserted into one of the plurality of grooves 3250. At this time, unless a user rotates the lens accommodating member 3270 with a force greater than the tension at which the insertion protrusion 3142 is inserted into the groove according to the elasticity of the arm 3141, the insertion protrusion 3142 may be maintained in a state of being inserted into the groove.

For example, the insertion protrusion 3142 may be inserted into one of the plurality of grooves 3250, thereby restricting the arbitrary rotation of the second housing 3200.

When the second housing 3200 is rotated by the user's pressure, the insertion protrusion 3142 may be separated from one of the plurality of grooves 3250, and when the rotation of the second housing 3200 is finished, the insertion protrusion 3142 may be inserted into any other groove, which is the closest to the insertion protrusion 3142 among the plurality of grooves 3250 after the rotation of the second housing 3200, so as to restrict the arbitrary rotation of the second housing 3200.

For example, when the insertion protrusion 3142 moves away from a high part of the outer circumferential surface of the lens accommodating member 3270 by rotation of the second housing 3200, the insertion protrusion 3142 may collide with a groove due to the elasticity of the arm 3141 of the stopper 3140 and a noise caused by the collision may be generated. Accordingly, a user can adjust the amount of rotation of the second housing 3200 by recognizing the sound during the adjusting process.

The second housing 3200 may include a first case 3230 and a second case 3240 to accommodate the plurality of refractive lenses 2110, 2120, and 2130 in the second housing 3200.

The first case 3230 and the second case 3240 may be provided to extend in the direction of the optical axis A and coupled to each other in a direction perpendicular to the optical axis A. This is to easily accommodate the plurality of refractive lenses 2110, 2120, and 2130 in the first case 3230 or the second case 3240.

When the first case 3230 and the second case 3240 are provided to be coupled in the direction of the optical axis A, it is required that the plurality of refractive lenses 2110, 2120, and 2130 may be accommodated in a stacked manner inside the first case 3230 or the second case 3240. However, in a process of stacking the plurality of refractive lenses 2110, 2120, and 2130, a tolerance in the position of the plurality of refractive lenses 2110, 2120, and 2130 may occur, thereby causing the displacement of the optical axis A.

However, the first case 3230 and the second case 3240 may be provided to extend in the direction of the optical axis A and coupled to each other in the direction perpendicular to the optical axis A. Accordingly, in a state in which the first case 3230 and the second case 3240 are separated, it is possible to accommodate the plurality of refractive lenses 2110, 2120, and 2130 in the direction perpendicular to the direction of the optical axis A in the first case 3230 or the second case 3240, and then the first case 3230 and the second case 3240 may be coupled to each other. Therefore, it is possible to allow the plurality of refractive lenses 2110, 2120, and 2130 to be accommodated in designated positions inside the second housing 3200.

The first refractive lens 2110 may include a first refractive lens holder 2111 surrounding an edge of the first refractive lens 2110. The lens accommodating member 3270 may include a first refractive lens insertion groove 3271, to which the first refractive lens holder 2111 is inserted, so as to allow the first refractive lens to be accommodated in the second housing 3200.

The second refractive lens 2120 may include a second refractive lens holder 2121 surrounding an edge of the second refractive lens 2120. The lens accommodating member 3270 may include a second refractive lens insertion groove 3272, to which the second refractive lens holder 2121 is inserted, so as to allow the second refractive lens to be accommodated in the second housing 3200.

The third refractive lens 2130 may include a third refractive lens holder 2131 surrounding an edge of the third refractive lens 2130. The lens accommodating member 3270 may include a third refractive lens insertion groove 3273, to which the third refractive lens holder 2131 is inserted, so as to allow the third refractive lens to be accommodated in the second housing 3200.

In the manufacturing process, because the size of the plurality of refractive lenses 2110, 2120, and 2130 is small, each of the refractive lenses 2110, 2120, and 2130 may be inserted into different refractive lens insertion grooves without being inserted into the corresponding refractive lens insertion grooves 3271, 3272, and 3273, and thus the plurality of refractive lenses 2110, 2120, and 2130 may be disposed in the wrong order in the vertical direction.

To prevent the above-mentioned difficulty, each of the refractive lens holders 2111, 2121, and 2131 may include a mark having a different size or shape.

The first refractive lens holder 2111 may include a first mark 2112.

The second refractive lens holder 2121 may include a second mark 2122.

The third refractive lens holder 2131 may include a third mark 2132.

The first refractive lens insertion groove 3271 may have a shape corresponding to the first mark 2112 to allow the first mark 2112 to be inserted therein.

The second refractive lens insertion groove 3272 may have a shape corresponding to the second mark 2122 to allow the second mark 2122 to be inserted therein.

The third refractive lens insertion groove 3273 may have a shape corresponding to the third mark 2132 to allow the third mark 2132 to be inserted therein.

In other words, the marks 2112, 2122, and 2132 are formed in different shapes or sizes, and thus unless the marks 2112, 2122, and 2132 are inserted to the corresponding refractive lens insertion grooves 3271, 3272, and 3273, the marks 2112, 2122, and 2132 may not be inserted into the refractive lens insertion grooves 3271, 3272, and 3273. Accordingly, each of the refractive lenses 2110, 2120, and 2130 may be easily accommodated in a predetermined position.

Figure 11:
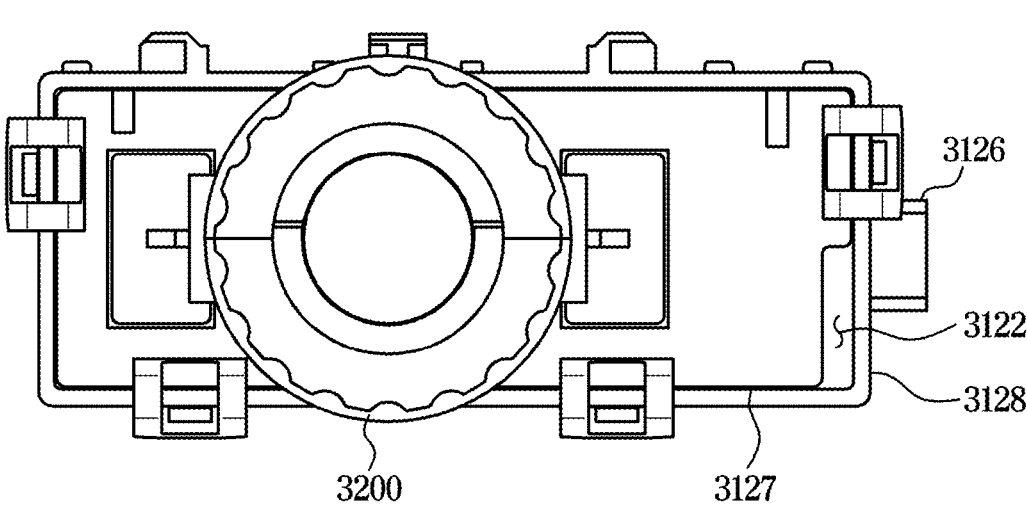
FIG. 11 is a bottom view of a display apparatus according to an embodiment.
Figure 12:
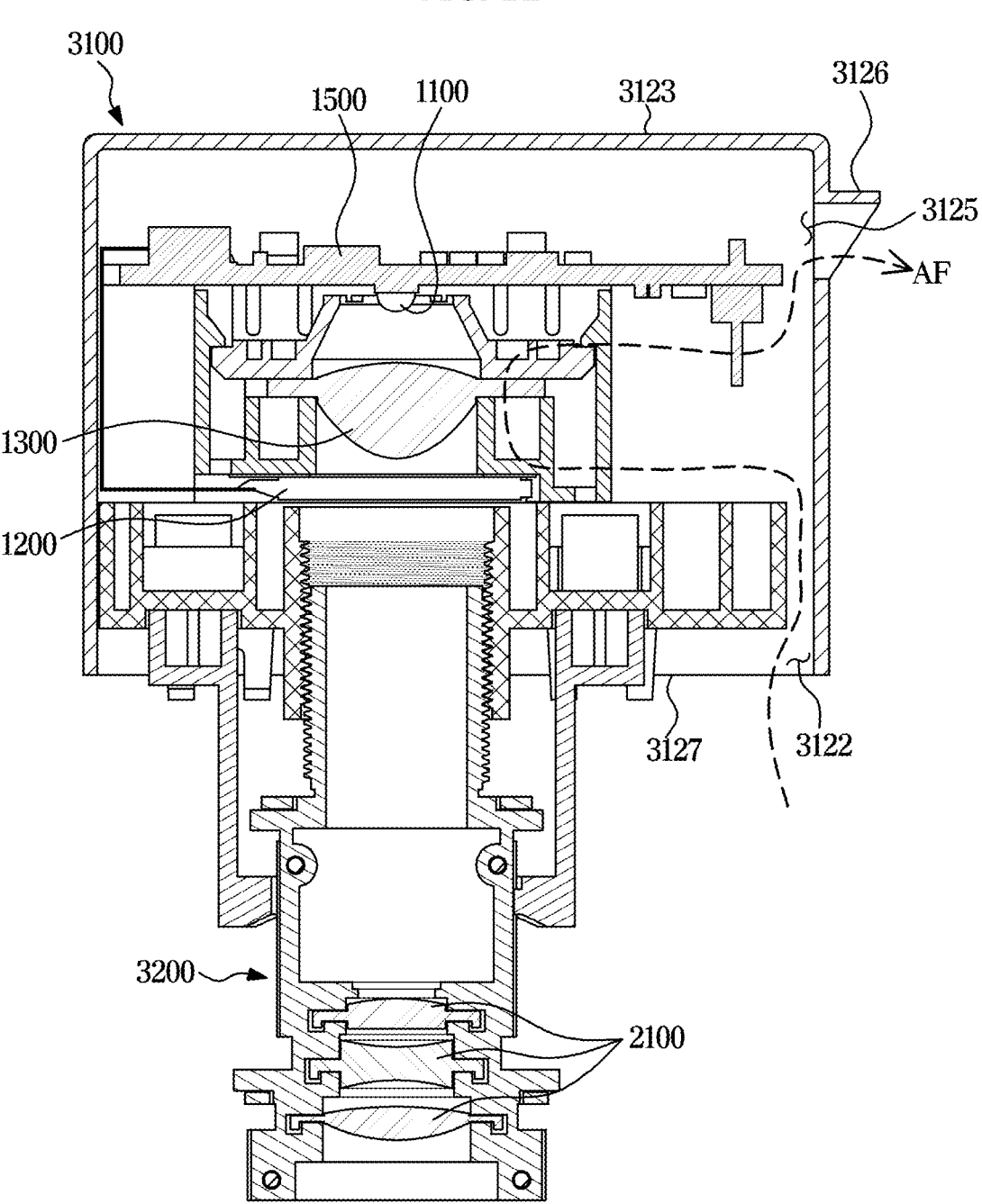
FIG. 12 is a schematic view illustrating a flow of air inside the display apparatus according to an embodiment.
Figure 13:
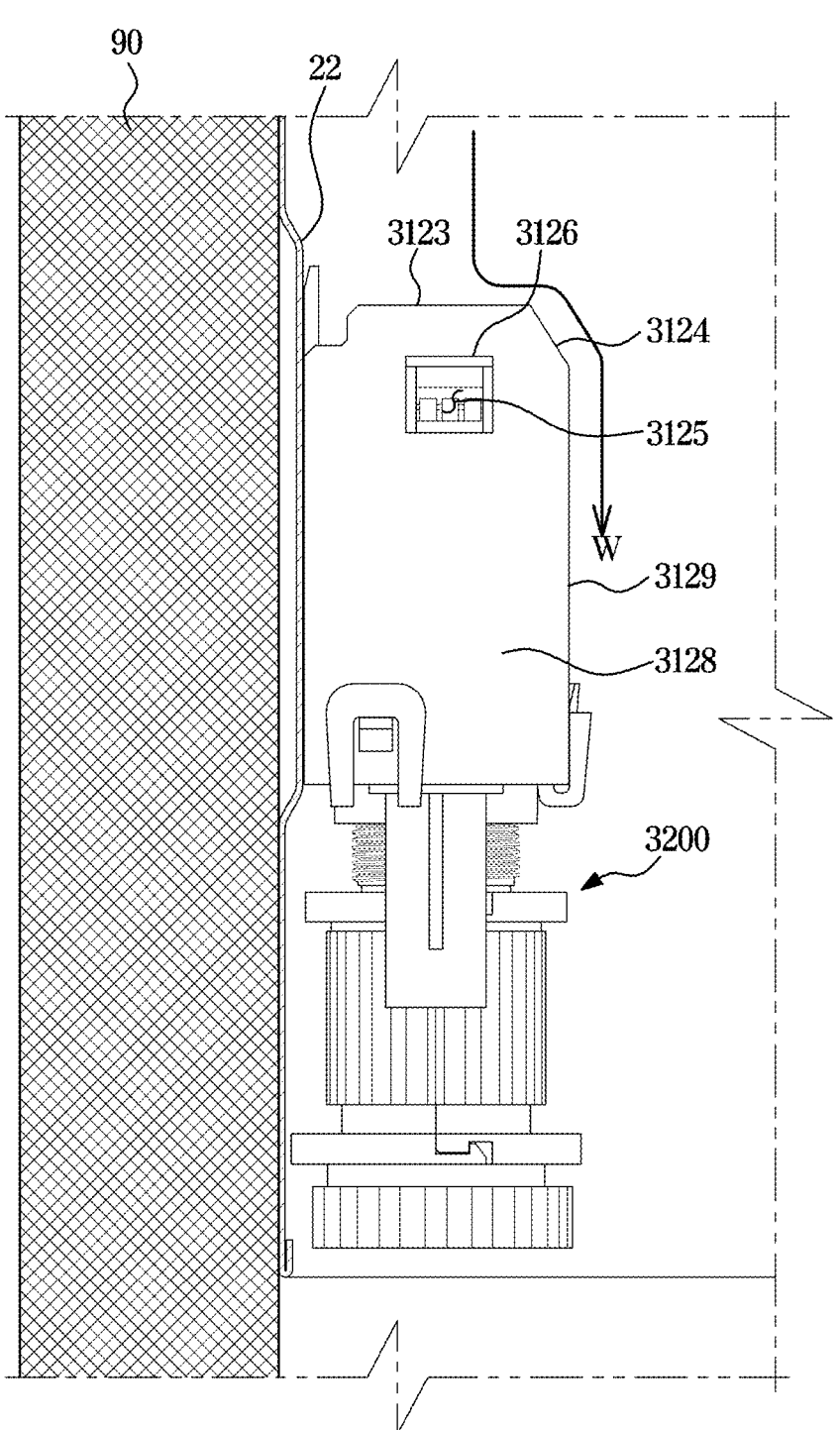
FIG. 13 is a schematic view illustrating a flow of external liquid of the display apparatus according to an embodiment.

FIG. 11 is a bottom view of a display apparatus according to an embodiment, FIG. 12 is a schematic view illustrating a flow of air inside the display apparatus according to an embodiment, and FIG. 13 is a schematic view illustrating a flow of external liquid of the display apparatus according to an embodiment.

As described above, the first case 3120 may include the outlet 3125 for discharging heat generated by the light source 1100. While the heat generated by the light source 1100 may cause the temperature inside the first housing 3100 to rise, which may cause damage to the printed circuit board 1500 and the light source 1100. However, heat may be circulated through the outlet 3125, and the temperature inside the first housing 3100 may be reduced by heat dissipation due to the heat circulation.

For example, the first housing 3100 may include an inlet 3122 through which air flows into the first housing 3100. The air introduced through the inlet 3122 may circulate inside the first housing 3100, may be heat exchanged, and may then be discharged to the outside of the first housing 3100 through the outlet 3125.

For example, the inlet 3122 may be disposed in the second housing 3200. Air introduced through the inlet 3122 may flow inside the second housing 3200 and the first housing 3100, and then be discharged to the outside of the housing 3100 through the outlet 3125.

For example, the outlet 3100, the light source 1100, the illumination lens 1300, the display device 1200, and the inlet 3122 may each be sequentially arranged from the top to the bottom.

For example, the outlet 3125 may be disposed at a position higher than the lower surface 1520 of the printed circuit board 1500 in the vertical direction to facilitate heat exchange of the air introduced into the first housing 3100 via the inlet 3122.

For example, the outlet 3125 may be disposed higher than the lower surface 1520 of the printed circuit board 1500 so that the air introduced through the inlet 3122 is heat exchanged with heat generated by the light source 1100 disposed on the lower surface 1520 of the printed circuit board 1500 and then discharged to the outside of the first housing 3100 through the outlet 3125.

For example, air (AF) introduced through the inlet 3122 disposed lower than the printed circuit board 1500 may flow into the first housing 3100 and flow upward, heat exchange with heat generated by the light source 1100 disposed on the lower surface 1520 of the printed circuit board 1500, and then discharged to the outside of the first housing 3100 through the outlet 3125 disposed higher than the lower surface 1520 of the printed circuit board 1500.

For example, the first housing 3100 may include the upper surface 3123 facing upward and a lower surface 3127 facing downward along the vertical direction. The upper surface 3123 of the first housing 3100 may be arranged to face the upper surface 1510 of the printed circuit board 1500. The lower surface 3127 of the first housing 3100 may be arranged to face the lower surface 1520 of the printed circuit board 1500.

For example, the first housing 3100 may include a pair of side surfaces 3128 arranged on opposite sides in the longitudinal direction of the printed circuit board 1500.

For example, the outlet 3125 may be formed on any one of the pair of side surfaces 3128 of the first housing 3100.

For example, the first housing 3100 may include a front surface 3129 formed between the pair of side surfaces 3128, and an assembly surface configured to be assembled to the outer surface 22 of the door 20 and facing the front surface 3129.

For example, the front surface 3129 of the first housing 3100 may be arranged to face the inner surface 21 of the door 20.

For example, the first housing 3100 may include the chamfer 3124 arranged to be inclined in the vertical direction between the upper surface 3123 of the first housing 3100 and the front surface 3129 of the first housing 3100.

This is to prevent moisture from accumulating on the upper surface 3123 when moisture flows into the display apparatus 100 due to water leakage inside the door 20. The chamfer 3124 may be arranged such that moisture W introduced to the upper surface 3123 flows down to the lower portion of the first housing 3100 along the slope of the chamfer 3124 to the front surface 3129 of the first housing 3100.

For example, the upper surface 3123 and the chamfer 3124 of the first housing 3100 may be configured to seal the interior of the first housing 3100 from the outside. The upper surface 3123 and the chamfer 3124 of the first housing 3100 may be configured to not include an opening or the like that communicates with the outside in an upward direction, thereby preventing moisture from the outside from flowing into the interior of the first housing 3100 in the vertical direction.

The first housing 3100 may include the eave 3126 disposed at an upper end of the outlet 3150 in the vertical direction and extending from the side surface 3128 of the first housing 3100 to the outside of the first housing 3100.

For example, the eave 3126 may block moisture from flowing into the first housing 3100 through the outlet 3125 in the vertical direction.

For example, the eave 3126 may be arranged to extend from the upper end of the outlet 3125 and from the upper end to a lateral end of the outlet 3125.

For example, the chamfer 3124 may not be disposed between the upper surface 3123 of the first housing 3100 and the side surface 3128 of the first housing 3100. This is because when the chamfer 3124 is disposed between the upper surface 3123 of the first housing 3100 and the side surface 3128 of the first housing 3100, moisture remaining on the upper surface 3123 may flow through the chamfer 3124 to the side surface 3128, and at this time, a portion of the moisture flowing to the side surface 3128 may flow into the outlet 3125. Accordingly, to prevent moisture from flowing into the outlet 3125, the chamfer 3124 may not be disposed between the upper surface 3123 of the first housing 3100 and the side surface 3128 of the first housing 3100.

In a home appliance including a display apparatus configured to project an image displaying state information of the home appliance according to an embodiment, the display apparatus may be arranged on a rear side of a front panel arranged on a front of the home appliance, and configured to project the image downward from the home appliance.

For example, the display apparatus may include an image generator including a light source, a display device configured to transmit light generated by the light source and display an image thereon, and an illumination lens configured to condense the light generated by the light source to the display device.

For example, the display apparatus may include an adjustor including a refractive lens configured to adjust a size of the image displayed on the display device to allow a size of the image projected from the display apparatus to be adjustable.

For example, the display apparatus may include a housing in which the image generator and the adjustor are accommodated.

For example, the housing may include an inlet through which air flows into the housing and an outlet through which air introduced through the inlet is discharged.

For example, the outlet, the light source, the illumination lens, the display device, and the inlet are each sequentially arranged from an upper side to a lower side.

For example, the housing may include a first housing in which the image generator is accommodated and a second housing in which the adjustor is accommodated.

For example, the inlet may be disposed at a lower portion of the first housing.

For example, the outlet may be disposed at a position higher in a vertical direction than the light source in the first housing.

For example, the display apparatus may include a printed circuit board on which a chip configured to control the light source and the display device is mounted.

For example, the outlet may be disposed at a position higher in the vertical direction than the printed circuit board.

For example, the printed circuit board may include an upper surface facing upward and a lower surface facing downward in the vertical direction.

For example, the light source may be mounted on the lower surface of the printed circuit board.

For example, the housing may include an upper surface facing an upper surface of the printed circuit board.

For example, the housing may include a lower surface facing a lower surface of the printed circuit board.

For example, the housing may include a pair of side surfaces disposed on opposite sides in a longitudinal direction of the printed circuit board.

For example, the outlet may be formed on any one of the pair of side surfaces of the housing.

For example, the housing may include a front surface disposed between the pair of side surfaces, and a chamfer arranged to be inclined in the vertical direction between the upper surface and the front surface.

For example, the upper surface and the chamfer of the housing may be configured to seal an inside of the housing in the vertical direction.

For example, the housing may include an assembly surface configured to allow the display apparatus to be assembled to the home appliance, the assembly surface facing the front surface.

For example, the housing may include an eave disposed at an upper end of the outlet in a vertical direction of the housing and protruding from the housing to an outside of the housing.

For example, the second housing may be configured to move relative to the first housing so that a distance between the display device and the refractive lens is changed.

For example, the second housing may be configured to move reciprocally in the vertical direction by rotation with respect to the first housing.

For example, the second housing may be configured to move relative to the first housing.

For example, the second housing may include a projection hole arranged at a lower portion of the second housing to allow an image transmitted through the refractive lens to be projected downward from the housing.

In a dishwasher including a display apparatus configured to project an image displaying state information of the dishwasher according to an embodiment onto a floor on which the dishwasher is installed, a washing chamber, and a door configured to forwardly open or close the washing chamber, the display apparatus may be arranged inside the door.

For example, the display apparatus may include an image generator including a light source, a display device configured to transmit light generated by the light source and display an image, and an illumination lens configured to condense the light generated by the light source to the display device.

For example, the display apparatus may include an adjustor including a refractive lens configured to adjust a size of the image displayed on the display device to allow a size of the image projected from the display apparatus to be adjustable.

For example, the display apparatus may include a housing in which the image generator and the adjustor are accommodated.

For example, the housing may include a first housing in which the image generator is accommodated.

For example, the housing may include a second housing in which the adjustor is accommodated.

For example, the first housing may include an inlet through which air flows into the housing and disposed at a lower portion of the first housing in a vertical direction.

For example, the first housing may include an outlet disposed at a position higher in the vertical direction than the light source.

For example, the outlet, the light source, the illumination lens, the display device, and the inlet are each sequentially arranged from an upper side to a lower side.

For example, the display apparatus may include a printed circuit board on which a chip configured to control the light source and the display device is mounted.

For example, the outlet may be disposed at a position higher in the vertical direction than the printed circuit board.

For example, the printed circuit board may include an upper surface facing upward in the vertical direction.

For example, the printed circuit board may include a lower surface facing downward.

For example, the light source may be mounted on the lower surface of the printed circuit board.

For example, the housing may include an upper surface facing the upper surface of the printed circuit board.

For example, the housing may include a lower surface facing the lower surface of the printed circuit board.

For example, the housing may include a pair of side surfaces disposed on opposite sides in a longitudinal direction of the printed circuit board.

For example, the outlet may be formed on any one of the pair of side surfaces of the housing.

For example, the housing may include a front surface formed between the pair of side surfaces.

For example, the housing may include an assembly surface configured to be assembled to the display apparatus inside the door and facing the front surface.

For example, the housing may include a chamfer arranged to be inclined in the vertical direction between the upper surface and the front surface.

For example, the housing may include an eave disposed at an upper end of the outlet in a vertical direction of the housing and extending from the side surface of the housing to an outside of the housing.

Although a few embodiments of the disclosure have been shown and described, it would be appreciated by those skilled in the art that changes may be made in these embodiments without departing from the principles and spirit of the disclosure, the scope of which is defined in the claims and their equivalents.

While the present disclosure has been particularly described with reference to exemplary embodiments, it should be understood by those of skilled in the art that various changes in form and details may be made without departing from the spirit and scope of the present disclosure.

The invention claimed is:

1. A home appliance comprising:
a display apparatus configured to project an image including state information of the home appliance,
wherein the display apparatus is arranged on a rear side of a front panel arranged on a front surface of the home appliance, and configured to project the image downward from the home appliance,
wherein the display apparatus comprises:
an image generator comprising a light source, a display device configured to transmit light generated by the light source and display the image, and an illumination lens configured to condense the light generated by the light source to the display device, an adjustor comprising a refractive lens configured to adjust a size of the image displayed on the display device to allow a size of the image projected from the display apparatus to be adjustable, and
a first housing configured to accommodate the image generator and a second housing configured to accommodate the adjustor,
wherein the first housing comprises an inlet through which air flows into the first housing, and an outlet through which the air introduced through the inlet is discharged, and
the outlet, the light source, the illumination lens, the display device, and the inlet are sequentially arranged from an upper side of the second housing to a lower side of the first housing.

2. The home appliance of claim 1, wherein
the display apparatus comprises the second housing configured to accommodate the adjustor, and
the inlet is disposed at a lower portion of the first housing.

3. The home appliance of claim 2, wherein the outlet is disposed in the first housing along a vertical direction of the first housing at a position higher than a position of the light source in the first housing.

4. The home appliance of claim 3, wherein the second housing is configured to move relative to the first housing so that a distance between the display device and the refractive lens is changed.

5. The home appliance of claim 4, wherein the second housing is configured to move reciprocally along the vertical direction by rotation with respect to the first housing.

6. The home appliance of claim 3, wherein the second housing is configured to move relative to the first housing, and comprises a projection hole arranged at a lower portion of the second housing to allow an image transmitted through the refractive lens to be projected downward from the first housing.

7. The home appliance of claim 1, wherein
the display apparatus further comprises a printed circuit board on which a chip configured to control the light source and the display device is mounted, and
the outlet is disposed along a vertical direction of the first housing at a position higher than a position of the printed circuit board.

8. The home appliance of claim 7, wherein
the printed circuit board comprises an upper surface facing upward and a lower surface facing downward along the vertical direction, and
the light source is mounted on the lower surface of the printed circuit board.

9. The home appliance of claim 7, wherein the first housing comprises an upper surface facing an upper surface of the printed circuit board, a lower surface facing a lower surface of the printed circuit board, and a pair of side surfaces disposed on opposite sides along a longitudinal direction of the printed circuit board, and
the outlet is formed on any one of the pair of side surfaces of the first housing.

10. The home appliance of claim 9, wherein the first housing further comprises a front surface disposed between the pair of side surfaces, and a chamfer arranged to be inclined along the vertical direction between the upper surface and the front surface.

11. The home appliance of claim 10, wherein the upper surface and the chamfer of the first housing are configured to seal an inside of the first housing along the vertical direction.

12. The home appliance of claim 10, wherein the first housing further comprises an assembly surface configured to allow the display apparatus to be assembled to the home appliance, the assembly surface facing the front surface.

13. The home appliance of claim 1, wherein the first housing further comprises an eave disposed at an upper end of the outlet in a vertical direction of the first housing and protruding from the first housing to an outside of the first housing.

14. A dishwasher comprising:

a display apparatus configured to project an image including state information of the dishwasher onto a floor on which the dishwasher is installed, a washing chamber, and a door configured to open or close forwardly of the washing chamber, wherein the display apparatus is arranged inside the door, and wherein the display apparatus comprises:

an image generator comprising a light source, a display device configured to transmit light generated by the light source and display the image, and an illumination lens configured to condense the light generated by the light source to the display device, an adjustor including a refractive lens configured to adjust a size of the image displayed on the display device to allow a size of the image projected from the display apparatus to be adjustable, and a housing configured to accommodate the image generator and the adjustor, wherein the housing comprises a first housing configured to accommodate the image generator, and a second housing configured to accommodate the adjustor, and the first housing comprises an inlet through which air flows into the housing and disposed at a lower portion of the first housing along a vertical direction of the housing, and an outlet disposed at a higher position along the vertical direction of the housing than a position of the light source.

15. The dishwasher of claim 14, wherein the outlet, the light source, the illumination lens, the display device, and the inlet are sequentially arranged from an upper side of the housing to a lower side of the housing.

* * * * *